(12) United States Patent
Wang et al.

(10) Patent No.: US 12,382,328 B2
(45) Date of Patent: Aug. 5, 2025

(54) MEASUREMENT REPORTING METHOD AND APPARATUS

(71) Applicant: Huawei Technologies Co., Ltd., Guangdong (CN)

(72) Inventors: Xiaona Wang, Chengdu (CN); Peng Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 623 days.

(21) Appl. No.: 17/587,870

(22) Filed: Jan. 28, 2022

(65) Prior Publication Data

US 2022/0150744 A1    May 12, 2022

Related U.S. Application Data

(63) Continuation of application No. PCT/CN2020/099624, filed on Jul. 1, 2020.

(30) Foreign Application Priority Data

Jul. 29, 2019    (CN) .......................... 201910689898.0

(51) Int. Cl.
   *H04W 24/10*    (2009.01)
   *H04L 5/00*    (2006.01)
   *H04W 24/08*    (2009.01)

(52) U.S. Cl.
   CPC .............. *H04W 24/10* (2013.01); *H04L 5/001* (2013.01); *H04W 24/08* (2013.01)

(58) Field of Classification Search
   CPC ........ H04W 24/10; H04W 24/08; H04L 5/001
   See application file for complete search history.

(56) References Cited

U.S. PATENT DOCUMENTS 11,588,538 B2 * 2/2023 Chen ...................... H04B 7/063
2017/0374637 A1 * 12/2017 Akkarakaran ........ H04W 24/10
(Continued)

FOREIGN PATENT DOCUMENTS

CN    102883341 A    1/2013
CN    107079404 A    8/2017
(Continued)

OTHER PUBLICATIONS

3GPPTSG RAN WGI Meeting #91 ,R1-1719443, Remaining details of QCL assumptions, Huawei, HiSilicon ,Reno, USA, Nov. 27-Dec. 1, 2017, total 6 pages.
Samsung, Discussion on necessity and details for physical-layer procedures to support UE/gNB measurements. 3GPP TSG RAN WG1 #97, Reno, USA, May 13-17, 2019, R1-1906910, 8 pages.
3GPP TS 38.331 V15.6.0 (Jun. 2019), 3rd Generation Partnership Project; Technical Specification Group Radio Access Network; NR; Radio Resource Control (RRC) protocol specification (Release 15), 519 pages.
(Continued)

*Primary Examiner* — Joseph E Avellino
*Assistant Examiner* — Maryam Emadi
(74) *Attorney, Agent, or Firm* — WOMBLE BOND DICKINSON (US) LLP

(57) ABSTRACT

This application provides a measurement reporting method and an apparatus. The method includes: receiving pilot measurement configuration information of a plurality of carriers, where the pilot measurement configuration information indicates a pilot association relationship of the plurality of carriers, and the pilot association relationship indicates that pilots of the plurality of carriers correspond to a same spatial domain transmit filter; performing measurement based on the pilot measurement configuration information, to obtain measurement report results of the plurality of carriers; and sending the measurement report results. The pilot association relationship of the plurality of carriers is configured for a terminal device, so that the terminal device may report, for the plurality of carriers, measurement results of the pilots corresponding to one or more same spatial domain transmit filters.

20 Claims, 4 Drawing Sheets

(56) References Cited

U.S. PATENT DOCUMENTS

2019/0215712 A1\* 7/2019 Babaei .................. H04L 1/1812
2019/0230646 A1    7/2019 Li et al.

FOREIGN PATENT DOCUMENTS

| CN | 107888266 A | 4/2018 | |
|---|---|---|---|
| CN | 109314945 A | 2/2019 | |
| CN | 112312460 A | 2/2021 | |
| EP | 3499785 A1 | 6/2019 | |
| WO | 2019097356 A1 | 5/2019 | |
| WO | WO-2021223730 A1 \* | 11/2021 | ........... H04B 7/0617 |

OTHER PUBLICATIONS

3GPP TS 38.211 V15.6.0 (Jun. 2019), 3rd Generation Partnership Project; Technical Specification Group Radio Access Network; NR; Physical channels and modulation (Release 15), 97 pages.

3GPP TS 38.212 V15.6.0 (Jun. 2019), 3rd Generation Partnership Project; Technical Specification Group Radio Access Network; NR; Multiplexing and channel coding (Release 15), 101 pages.

3GPP TS 38.213 V15.6.0 (Jun. 2019), 3rd Generation Partnership Project; Technical Specification Group Radio Access Network; NR; Physical layer procedures for control (Release 15), 107 pages.

\* cited by examiner

MEASUREMENT REPORTING METHOD AND APPARATUS

CROSS-REFERENCE TO RELATED APPLICATIONS

This application is a continuation of International Application No. PCT/CN2020/099624, filed on Jul. 1, 2020, which claims priority to Chinese Patent Application No. 201910689898.0, filed on Jul. 29, 2019, the disclosures of which are incorporated herein by reference in their entireties.

TECHNICAL FIELD

This application relates to the communication field, and more particularly, to a measurement reporting method and an apparatus.

BACKGROUND

In a fifth generation (5G) mobile communication system, communication may be performed by using a plurality of carriers. For example, in a range of a frequency band of 24250 MHz to 52600 MHz (which may be referred to as a high frequency band, and may also be referred to as an FR2), a network device may communicate with a terminal device by using a plurality of carriers.

In the 5G mobile communication system, communication is performed by using a beamforming technology. The beamforming technology refers to a technology that concentrates signal energy in a relatively small range by using a large-scale antenna array, to form a signal similar to an optical beam, so that a signal transmission distance is extended. The signal similar to the optical beam may be referred to as an analog beam, a beam for short. The network device may generate beams in different directions, and a specific direction of a beam to be used to communicate with the terminal device is determined through beam management.

When the plurality of carriers share one radio frequency channel, an existing beam management method may result in a fact that the network device cannot simultaneously use the plurality of carriers to communicate with the terminal device. As a result, a user capacity is limited, and communication efficiency is reduced.

SUMMARY

This application provides a measurement reporting method and an apparatus, so that when a plurality of carriers share one radio frequency channel, a network device can simultaneously use the plurality of carriers to communicate with a terminal device, thereby improving communication efficiency.

According to a first aspect, a measurement reporting method is provided. The method may be performed by a terminal device, or may be performed by a chip or a circuit disposed in the terminal device. The method includes: receiving pilot measurement configuration information of a plurality of carriers, where the pilot measurement configuration information of the plurality of carriers indicates a pilot association relationship of the plurality of carriers, and the pilot association relationship of the plurality of carriers indicates that pilots of the plurality of carriers correspond to a same spatial domain transmit filter; performing measurement based on the pilot measurement configuration information of the plurality of carriers, to obtain measurement report results of the plurality of carriers; and sending the measurement report results of the plurality of carriers.

According to a second aspect, a measurement reporting method is provided. The method may be performed by a network device, or may be performed by a chip or a circuit disposed in the network device. The method includes: sending pilot measurement configuration information of a plurality of carriers to a terminal device, where the pilot measurement configuration information of the plurality of carriers indicates a pilot association relationship of the plurality of carriers, and the pilot association relationship of the plurality of carriers indicates that pilots of the plurality of carriers correspond to a same spatial domain transmit filter; and receiving, from the terminal device, measurement report results that are of the plurality of carriers and that are obtained based on the pilot measurement configuration information of the plurality of carriers.

The pilot association relationship of the plurality of carriers indicates that the pilots of the plurality of carriers correspond to the same spatial domain transmit filter. In other words, the pilot association relationship of the plurality of carriers indicates an association relationship of a plurality of pilots corresponding to the same spatial domain transmit filter of the plurality of carriers.

For example, the plurality of carriers are a carrier 1, a carrier 2, and a carrier 3. The carrier 1, the carrier 2, and the carrier 3 all have a first spatial domain transmit filter. The pilot association relationship of the plurality of carriers may include an association relationship among a pilot that corresponds to the first spatial domain transmit filter and that is of the carrier 1, a pilot that corresponds to the first spatial domain transmit filter and that is of the carrier 2, and a pilot that corresponds to the first spatial domain transmit filter and that is of the carrier 3.

That the pilot measurement configuration information of the plurality of carriers indicates a pilot association relationship of the plurality of carriers indicates that: the pilot measurement configuration information of the plurality of carriers includes information that may indicate the pilot association relationship of the plurality of carriers.

It should be understood that, the terminal device may obtain the pilot association relationship of the plurality of carriers based on the received pilot measurement configuration information of the plurality of carriers, so that the terminal device may report, for the plurality of carriers, measurement results of pilots corresponding to one or more same spatial domain transmit filters. After receiving the measurement report results of the plurality of carriers, the network device may communicate with the terminal device based on the pilots that correspond to the same spatial domain transmit filter and that are of the plurality of carriers. Therefore, when the plurality of carriers share one radio frequency channel, the network device can simultaneously use the plurality of carriers to communicate with the terminal device according to the solution provided in this application.

The pilot association relationship of the plurality of carriers is configured for the terminal device, so that the terminal device may report, for the plurality of carriers, the measurement results of the pilots corresponding to the one or more same spatial domain transmit filters. In this way, when the plurality of carriers share one radio frequency channel, the network device can simultaneously use the plurality of carriers to communicate with the terminal device, that is, communication based on carrier aggregation is implemented. Therefore, communication efficiency can be improved.

In this application, the pilot association relationship of the plurality of carriers may be implemented in a plurality of manners.

In an embodiment, the pilot association relationship of the plurality of carriers includes: resource identifiers of the pilots that correspond to the same spatial domain transmit filter and that are of the plurality of carriers are the same.

After receiving the pilot measurement configuration information that is of the plurality of carriers and that is sent by the network device, the terminal device may learn that pilots with a same resource identifier correspond to a same spatial domain transmit filter.

In this embodiment, in the pilot measurement configuration information of the plurality of carriers, the resource identifier of the pilot may be any one of the following: a resource index, a resource set identifier, and a resource port identifier.

It should be understood that, in this embodiment, original information in the pilot measurement configuration information is multiplexed to indicate the pilot association relationship of the plurality of carriers, so that signaling utilization can be improved, and signaling overheads can be reduced.

In an embodiment, the pilot association relationship of the plurality of carriers includes: resources of the pilots that correspond to the same spatial domain transmit filter and that are of the plurality of carriers have an intersection.

After receiving the pilot measurement configuration information that is of the plurality of carriers and that is sent by the network device, the terminal device may learn that pilots whose resources have an intersection correspond to a same spatial domain transmit filter.

It should be understood that, in this embodiment, the resources of the pilots are used to indicate the pilot association relationship of the plurality of carriers, so that signaling overheads can be reduced.

In an embodiment, the pilot association relationship of the plurality of carriers includes: reporting resources of the pilots that correspond to the same spatial domain transmit filter and that are of the plurality of carriers are the same.

After receiving the pilot measurement configuration information that is of the plurality of carriers and that is sent by the network device, the terminal device may learn that pilots with a same reporting resource correspond to a same spatial domain transmit filter.

It should be understood that, in this embodiment, the reporting resource of the pilot is used to indicate the pilot association relationship of the plurality of carriers, that is, information originally included in the pilot measurement configuration information is multiplexed to indicate the pilot association relationship of the plurality of carriers, so that signaling utilization can be improved, and signaling overheads can be reduced.

In an embodiment, the pilot association relationship of the plurality of carriers includes: spatial domain transmit filter identifiers of the pilots that correspond to the same spatial domain transmit filter and that are of the plurality of carriers are the same.

After receiving the pilot measurement configuration information that is of the plurality of carriers and that is sent by the network device, the terminal device may learn that pilots with a same spatial domain transmit filter identifier correspond to a same spatial domain transmit filter.

The pilot association relationship of the plurality of carriers may include any one or more of the foregoing embodiments.

In an embodiment, the measurement report results of the plurality of carriers include measurement results of a plurality of pilots corresponding to the same spatial domain transmit filter, where the plurality of pilots are pilots of the plurality of carriers.

That the plurality of pilots are pilots of the plurality of carriers means that the plurality of pilots include one pilot included in each of the plurality of carriers.

It is assumed that the plurality of carriers are three carriers. Measurement report results of the three carriers include a measurement result of one pilot of each of the three carriers, that is, include measurement results of three pilots, where the three pilots correspond to the same spatial domain transmit filter.

The pilot association relationship of the plurality of carriers is configured for the terminal device, so that the terminal device may report, for the plurality of carriers, measurement results of the pilots corresponding to the same spatial domain transmit filter. In this way, when the plurality of carriers share one radio frequency channel, the network device can simultaneously use the plurality of carriers to communicate with the terminal device, that is, communication based on carrier aggregation is implemented. Therefore, communication efficiency can be improved.

In an embodiment, the measurement report results of the plurality of carriers include measurement results of a plurality of pilots corresponding to the same spatial domain transmit filter, where the plurality of pilots are pilots of the plurality of carriers, and the plurality of pilots include a pilot with an optimal measurement value.

That the plurality of pilots are pilots of the plurality of carriers means that the plurality of pilots include one pilot included in each of the plurality of carriers.

That the plurality of pilots include a pilot with an optimal measurement value means that the plurality of pilots include a pilot with an optimal measurement value in all pilots of the plurality of carriers.

It is assumed that the plurality of carriers are a carrier 1, a carrier 2, and a carrier 3, and each of the three carriers have three pilots corresponding to a spatial domain transmit filter 1, a spatial domain transmit filter 2, and a spatial domain transmit filter 3. It is assumed that a measurement value of a pilot that corresponds to the spatial domain transmit filter 1 and that is of the carrier 1 is optimal, the measurement report results of the three carriers include measurement results of pilots that correspond to the spatial domain transmit filter 1 and that are of the carrier 1, the carrier 2, and the carrier 3.

In an embodiment, the measurement report results of the plurality of carriers include measurement results of a plurality of pilots corresponding to the same spatial domain transmit filter, where the plurality of pilots are pilots of the plurality of carriers, and the same spatial domain transmit filter corresponding to the plurality of pilots is a spatial domain transmit filter with an optimal pilot average measurement value.

That the plurality of pilots are pilots of the plurality of carriers means that the plurality of pilots include one pilot included in each of the plurality of carriers.

The pilot average measurement value in this specification is for the spatial domain transmit filter. Each spatial domain transmit filter of the plurality of carriers corresponds to one pilot average measurement value. For example, a pilot average measurement value of a first spatial domain transmit filter refers to an average value of measurement values of a plurality of pilots corresponding to the first spatial domain transmit filter in all pilots of the plurality of carriers.

It is assumed that the plurality of carriers are a carrier 1, a carrier 2, and a carrier 3, and each of the three carriers have three pilots corresponding to a spatial domain transmit filter 1, a spatial domain transmit filter 2, and a spatial domain transmit filter 3. It is assumed that an average measurement value of three pilots corresponding to the spatial domain transmit filter 1 is optimal, the measurement report results of the three carriers include measurement results of pilots that correspond to the spatial domain transmit filter 1 and that are of the carrier 1, the carrier 2, and the carrier 3.

In an embodiment, the measurement report results of the plurality of carriers may include measurement results of pilots that correspond to one or more same spatial domain transmit filters and that are of the plurality of carriers.

It is assumed that the plurality of carriers are a carrier 1, a carrier 2, and a carrier 3, and each of the three carriers have three pilots corresponding to a spatial domain transmit filter 1, a spatial domain transmit filter 2, and a spatial domain transmit filter 3. Measurement report results of the three carriers may include measurement results of pilots that correspond to the spatial domain transmit filter 1 and that are of the carrier 1, the carrier 2, and the carrier 3, and measurement results of pilots that correspond to the spatial domain transmit filter 2 and that are of the carrier 1, the carrier 2, and the carrier 3, or may further include measurement results of pilots that correspond to the spatial domain transmit filter 3 and that are of the carrier 1, the carrier 2, and the carrier 3.

Therefore, in the solution provided in this application, the pilot association relationship of the plurality of carriers is configured for the terminal device, so that the terminal device may report, for the plurality of carriers, measurement results of pilots corresponding to one or more same spatial domain transmit filters. In this way, when the plurality of carriers share one radio frequency channel, the network device can simultaneously use the plurality of carriers to communicate with the terminal device, that is, communication based on carrier aggregation is implemented, and communication efficiency can be improved.

In an embodiment, the measurement report results of the plurality of carriers include at least one of the following: a carrier identifier, a pilot identifier, and a pilot measurement value.

In an embodiment, the pilot measurement value may be represented by any one of the following indicators: reference signal received power (RSRP), reference signal received quality (RSRQ), a reference signal received strength indicator (RSSI), a signal to noise ratio (SNR), a signal to interference and noise ratio (SINR), a block error rate (BLER), and a signal quality indicator (CQI).

In an embodiment, the measurement report results of the plurality of carriers may be jointly reported for the plurality of carriers, or separately reported for each of the plurality of carriers.

In an embodiment, the method further includes: determining, from the measurement report results of the plurality of carriers, pilots that are used for communication and that are of the plurality of carriers, where the pilots that are used for communication and that are of the plurality of carriers correspond to the same spatial domain transmit filter; and performing communication based on carrier aggregation with the terminal device based on the pilots that are used for communication and that are of the plurality of carriers.

Therefore, in the solution provided in this application, the pilot association relationship of the plurality of carriers is configured for the terminal device, so that when the plurality of carriers share one radio frequency channel, the network device can simultaneously use the plurality of carriers to communicate with the terminal device, that is, communication based on carrier aggregation is implemented, and communication efficiency can be improved.

In an embodiment, the plurality of carriers share one radio frequency channel.

That the plurality of carriers share one radio frequency channel means that pilots (namely, beams) of the plurality of carriers are sent by using a same radio frequency channel.

In an embodiment, the plurality of carriers may be component carriers (CC), or may be bandwidth parts (BWP).

According to a third aspect, a communication apparatus is provided. The communication apparatus may be configured to perform the method in the first aspect or the second aspect.

In an embodiment, the communication apparatus may include a module configured to perform the method in the first aspect or the second aspect.

It should be noted that, the method in the first aspect includes the method provided in any one of the first aspect or the embodiments of the first aspect, and the method in the second aspect includes the method provided in any one of the second aspect or the embodiments of the first aspect.

According to a fourth aspect, a communication apparatus is provided. The communication apparatus includes a processor, the processor is coupled to a memory, the memory is configured to store a computer program or instructions, and the processor is configured to execute the computer program or the instructions stored in the memory, so that the method in the first aspect or the second aspect is performed.

For example, the processor is configured to execute the computer program or the instructions stored in the memory, so that the communication apparatus performs the method in the first aspect or the second aspect.

In an embodiment, the communication apparatus includes one or more processors.

In an embodiment, the communication apparatus may further include a memory coupled to the processor.

In an embodiment, the communication apparatus may include one or more memories.

In an embodiment, the memory and the processor may be integrated together, or may be separately disposed.

In an embodiment, the communication apparatus may further include a transceiver.

According to a fifth aspect, a chip is provided. The chip includes a processing module and a communication interface. The processing module is configured to control the communication interface to communicate with the outside, and the processing module is further configured to perform the method in the first aspect or the second aspect.

In an embodiment, the processing module is a processor.

According to a sixth aspect, a computer-readable storage medium is provided. The computer-readable storage medium stores a computer program (or may be referred to as instructions or code) configured to implement the method in the first aspect or the second aspect.

For example, when the computer program is run by a computer, the computer is enabled to perform the method provided in any one of the first aspect or the second aspect. The computer may be a communication apparatus.

According to a seventh aspect, a computer program product is provided. The computer program product includes a computer program (or may be referred to as instructions or code), and when the computer program is run on a computer, the computer is enabled to perform the method in the first aspect or the second aspect. The computer may be a communication apparatus.

Based on the foregoing description, in this application, the pilot association relationship of the plurality of carriers is configured for a terminal device, so that the terminal device may report, for the plurality of carriers, measurement results of pilots corresponding to one or more same spatial domain transmit filters. In this way, when the plurality of carriers share one radio frequency channel, a network device can simultaneously use the plurality of carriers to communicate with the terminal device, that is, communication based on carrier aggregation is implemented. Therefore, communication efficiency can be improved.

DESCRIPTION OF EMBODIMENTS

Figure 1:
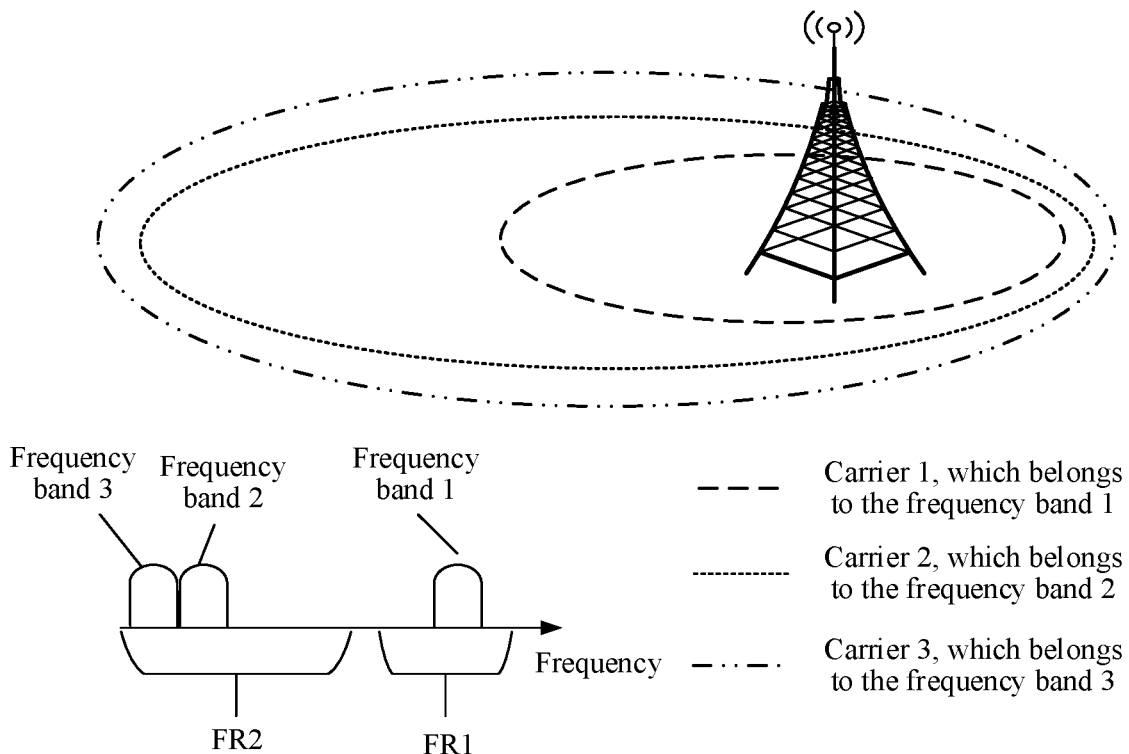
FIG. 1 is a schematic diagram of a scenario in which a network device and a terminal device perform communication by using a plurality of carriers.

The following describes technical solutions of this application with reference to accompanying drawings.

Unless otherwise defined, all technical and scientific terms used in this specification have a same meaning as that usually understood by a person skilled in the art of this application. The terms used in the specification of this application are merely for the purpose of describing specific embodiments, and are not intended to limit this application.

For ease of understanding the embodiments of this application, the following first describes some related concepts.
1. Beam The beam in an NR protocol may be embodied as a spatial domain filter that is also referred to as a spatial filter or a spatial parameter. A beam used to send a signal may be referred to as a transmit beam (Tx beam), or may be referred to as a spatial domain transmit filter or a spatial transmit parameter. A beam used to receive a signal may be referred to as a receive beam (Rx beam), or may be referred to as a spatial domain receive filter or a spatial receive parameter (spatial Rx parameter).

The transmit beam may refer to distribution of signal strength formed in different directions in space after a signal is transmitted by using an antenna, and the receive beam may refer to distribution of signal strength, in different directions in space, of a radio signal received from an antenna.

In addition, the beam may be a wide beam, a narrow beam, or a beam of another type. A technology for forming the beam may be a beamforming technology or another technology. The beamforming technology may be specifically a digital beamforming technology, an analog beamforming technology, a hybrid digital/analog beamforming technology, or the like.

The beam is usually corresponding to a resource. For example, during beam measurement, a network device measures different beams by using different resources, a terminal device feeds back measured resource quality, and the network device knows quality of a corresponding beam. During data transmission, beam information is also indicated by using a resource corresponding to the beam information. For example, the network device indicates information about a physical downlink shared channel (PDSCH) beam of the terminal device by using a transmission configuration indicator (TCI) resource in downlink control information (DCI).

In an embodiment, a plurality of beams whose communication features are the same or similar may be considered as one beam.

One beam may include one or more antenna ports, configured to transmit a data channel, a control channel, a sounding signal, and the like. The one or more antenna ports forming the beam may also be considered as one antenna port set.

In the embodiments of this application, unless otherwise specified, the beam is a transmit beam of the network device.

During beam measurement, each beam of the network device corresponds to one resource. Therefore, an index of the resource may be used to uniquely identify the beam corresponding to the resource.

A technology for forming the beam may be a beamforming technology or another technical means. By using the beamforming technology, a higher antenna array gain may be implemented by sending or receiving a signal in a specific direction in space. The beamforming technology may be a digital beamforming technology, an analog beamforming technology, or a hybrid digital/analog beamforming technology. Analog beamforming may be implemented by using a phase shifter. A radio frequency chain (RF chain) adjusts a phase by using a phase shifter, to control a change in a direction of an analog beam. Therefore, one radio frequency chain can output only one analog beam at a same moment.

The radio frequency chain may also be referred to as a radio frequency channel. That is, one radio frequency channel can output only one beam at a same moment.
2. Beam Resource During beam measurement, a beam corresponding to a resource may be uniquely identified through an index of the resource.

The resource may be an uplink signal resource, or may be a downlink signal resource.

The uplink signal includes but is not limited to: a sounding reference signal (SRS) and a demodulation reference signal (DMRS).

The downlink signal includes but is not limited to: a channel state information reference signal (CSI-RS), a cell-specific reference signal (CS-RS), a UE-specific reference signal (US-RS), a demodulation reference signal (DMRS), and a synchronization signal/physical broadcast channel block (SS/PBCH block). The SS/PBCH block may be referred to as a synchronization signal block (SSB) for short.

The resource may be configured by using radio resource control (RRC) signaling.

In a configuration structure, one resource is one data structure, including a related parameter of an uplink/downlink signal corresponding to the resource, for example, a type of the uplink/downlink signal, a resource element that carries the uplink/downlink signal, transmit time and a transmit periodicity of the uplink/downlink signal, and a quantity of ports used to send the uplink/downlink signal.

A resource of each uplink/downlink signal has a unique index, to identify the resource of the uplink/downlink signal. It may be understood that the index of the resource may also be referred to as an identifier of the resource. This is not limited in the embodiments of this application.

3. Beam Management

A network device may generate beams in different directions, and a specific direction of a beam to be used to communicate with a terminal device is determined through beam management.

Beam management mainly includes the following operations.

Operation 1: The network device configures a beam resource.

For example, that the network device configures a beam resource includes: The network device generates measurement configuration information (namely, beam measurement configuration information), and sends the measurement configuration information to the terminal device.

The measurement configuration information mainly includes two parts: resource configuration information and report configuration information.

The resource configuration information refers to information related to measurement resources. The resource configuration information may be configured in a protocol by using a three-level structure (a resource configuration (resourceConfig)—a resource set (resourceSet)—a resource (resource)).

The report configuration information refers to information related to measurement result reporting. The report configuration information may be configured in a protocol by using a report configuration (ReportConfig).

The network device may send the measurement configuration information to the terminal by using radio resource control (RRC) signaling.

Operation 2: The terminal device measures beam communication quality.

The network device sends a downlink signal (namely, a beam) on a resource element corresponding to the resource configured by using the resource configuration information. The terminal device receives the downlink signal on the resource element corresponding to the resource configured by using the resource configuration information, and measures the downlink signal based on the measurement configuration information to obtain quality of the downlink signal, namely, the beam communication quality.

Operation 3: The terminal device selects an optimal beam, and reports the optimal beam to the network device.

For example, the terminal device sends a beam measurement report to the network device, to indicate the optimal beam. The beam measurement report may include an index, quality, and the like of one or more resources.

The beam measurement report may be carried on a physical uplink control channel (PUCCH) or a physical uplink shared channel (PUSCH).

4. Beam Management Resource

The beam management resource refers to a resource used for beam management, and may also be represented as a resource used to calculate and measure beam quality. The beam quality includes layer 1 reference signal received power (L1-RSRP), layer 1 reference signal received quality (L1-RSRQ), and the like. In an embodiment, the beam management resource may include a synchronization signal, a broadcast channel, a downlink channel measurement reference signal, a tracking signal, a downlink control channel demodulation reference signal, a downlink shared channel demodulation reference signal, an uplink sounding reference signal, an uplink random access signal, and the like.

5: Beam Indication Information

The beam indication information is used to indicate a beam used for transmission, including a transmit beam and/or a receive beam. The beam indication information includes at least one of a beam number, a beam management resource number, an uplink signal resource number, a downlink signal resource number, an absolute index of a beam, a relative index of a beam, a logical index of a beam, an index of an antenna port corresponding to a beam, an index of an antenna port group corresponding to a beam, an index of a downlink signal corresponding to a beam, a time index of a downlink synchronization signal block corresponding to a beam, beam pair link (BPL) information, a transmit parameter (Tx parameter) corresponding to a beam, a receive parameter (Rx parameter) corresponding to a beam, a transmit weight corresponding to a beam, a weight matrix corresponding to a beam, a weight vector corresponding to a beam, a receive weight corresponding to a beam, an index of a transmit weight corresponding to a beam, an index of a weight matrix corresponding to a beam, an index of a weight vector corresponding to a beam, an index of a receive weight corresponding to a beam, a reception codebook corresponding to a beam, a transmit codebook corresponding to a beam, an index of a reception codebook corresponding to a beam, and an index of a transmit codebook corresponding to a beam, where the downlink signal includes any one of a synchronization signal, a broadcast channel, a broadcast signal demodulation signal, a channel state information downlink signal (CSI-RS), a cell-specific reference signal (CS-RS), a UE-specific reference signal (US-RS), a downlink control channel demodulation reference signal, a downlink data channel demodulation reference signal, and a downlink phase noise tracking signal. The uplink signal includes any one of an uplink random access sequence, an uplink sounding reference signal, an uplink control channel demodulation reference signal, an uplink data channel demodulation reference signal, and an uplink phase noise tracking signal. In an embodiment, the network device may further allocate a QCL identifier to beams having a quasi co-location (QCL) (which will be introduced in the following specification) relationship in beams associated with a frequency resource group. The beam may also be referred to as a spatial domain transmission filter, the transmit beam may also be referred to as a spatial domain transmit filter, and the receive beam may also be referred to as a spatial domain receive filter. The beam indication information may be further represented as a transmission configuration index (TCI). The TCI may include a plurality of parameters such as a cell number, a bandwidth part number, a reference signal identifier, a synchronization signal block identifier, and a QCL type.

6. Beam Quality

Measurement indicators for measuring the beam quality are not limited in this application.

The measurement indicators for measuring the beam quality include but are not limited to:

reference signal received power (RSRP);
reference signal received quality (RSRQ);
a reference signal received strength indicator (RSSI);
a signal to interference and noise ratio (SINR);
a block error rate (BLER); and
a signal quality indicator (CQI).

7. Quasi Co-Location (QCL)

A co-location relationship is used to indicate that a plurality of resources have one or more same or similar communication features. A same or similar communication configuration may be used for the plurality of resources having the co-location relationship. For example, if two antenna ports have the co-location relationship, a large-scale channel property in which one port transmits a symbol may be inferred from a large-scale channel property in which the other port transmits a symbol. The large-scale property may include delay spread, an average delay, Doppler spread, Doppler frequency shift, an average gain, a receive parameter, a receive beam number of a terminal device, transmit/receive channel correlation, a receive angle of arrival, spatial correlation of a receiver antenna, a dominant angle of arrival (AoA), an average angle of arrival, AoA spread, and the like.

8. Spatial Domain Quasi Co-Location (Spatial QCL)

The spatial domain quasi co-location may be considered as a type of QCL. The term "spatial" may be understood from two perspectives: from a transmit end or from a receive end. From the perspective of the transmit end, if two antenna ports are spatially quasi co-located, it indicates that beam directions corresponding to the two antenna ports are the same in space. From the perspective of the receive end, if two antenna ports are spatially quasi co-located, it indicates that the receive end can receive, in a same beam direction, signals sent through the two antenna ports.

9. Quasi Co-Location Assumption (QCL Assumption)

The quasi co-location assumption means that it is assumed whether there is a QCL relationship between two ports. A configuration and an indication of the quasi co-location assumption may be used to help the receive end receive and demodulate a signal. For example, the receive end can determine that there is a QCL relationship between a port A and a port B. In other words, a large-scale parameter of a signal obtained through measurement on the port A may be used to measure and demodulate a signal on the port B.

10. Simultaneous Receiving

The simultaneous receiving includes that a receive end (for example, a terminal device) receives a plurality of signals on one receive parameter, and also includes receiving a plurality of signals on a plurality of receive parameters that can be used simultaneously.

11. Antenna Panel

Signals in wireless communication need to be received and sent through antennas, and a plurality of antenna elements (antenna element) may be integrated on one panel (panel). This panel may be referred to as the antenna panel. The antenna panel may alternatively be represented as an antenna array or an antenna subarray. One antenna panel may include one or more antenna arrays/subarrays. One antenna panel may be controlled by one or more oscillators.

In the embodiments of this application, the terminal device may include a plurality of antenna panels, and each antenna panel includes one or more beams. The network device may also include a plurality of antenna panels, and each antenna panel includes one or more beams.

The antenna unit is driven by the radio frequency chain. One radio frequency chain may drive one or more antenna elements. One antenna panel may be driven by one radio frequency chain, or may be driven by a plurality of radio frequency chains. The antenna panel in this application may alternatively be replaced with a radio frequency chain, a plurality of radio frequency chains that drive one antenna panel, or one or more radio frequency chains controlled by one oscillator.

The radio frequency chain may also be referred to as a radio frequency channel.

For example, the radio frequency channel may include a receive channel and/or a transmit channel.

The radio frequency chain or radio frequency channel may also be referred to as a receiver branch.

Two frequency ranges (FR) are supported in Release 15, which is the first release of the 5G standard: a frequency range of 450 MHz to 6000 MHz (which may be referred to as a low frequency band, an FR1 for short) and a frequency range of 24250 MHz to 52600 MHz (which may be referred to as a high frequency band, an FR2 for short). The network device uses different radio frequency channels for the FR1 and the FR2. For example, for the FR2, a high-frequency antenna array is used, the high-frequency antenna array is in a large scale, and an analog beam output by using the high-frequency antenna array is narrow; for the FR1, a low-frequency antenna array is used, the low-frequency antenna array is in a small scale, and an analog beam output by using the low-frequency antenna array is wide.

In a 5G mobile communication system, communication may be performed by using a plurality of carriers. For example, in a range of a frequency band of 24250 MHz to 52600 MHz (namely, the high frequency band, and may also be referred to as the FR2), the network device may communicate with the terminal device by using a plurality of carriers. As shown in FIG. 1, the network device may perform communication based on carrier aggregation (CA) with the terminal device by using a carrier 1, a carrier 2, and a carrier 3. The carrier 1 belongs to a frequency band 1, and the frequency band 1 is located in the FR1. The carrier 2 belongs to a frequency band 2, the carrier 3 belongs to a frequency band 3, and the frequency band 2 and the frequency band 3 are located in the FR2.

When the plurality of carriers share one radio frequency channel, an existing beam management method may result in a fact that the network device cannot simultaneously use the plurality of carriers to communicate with the terminal device. Reasons are as follows.

(1) One radio frequency channel can correspond to only one spatial domain transmit filter at a same moment. When the plurality of carriers share one radio frequency channel, signals that are of the plurality of carriers and that are simultaneously sent by using the radio frequency channel correspond to a same spatial domain transmit filter.

(2) One radio frequency channel corresponds to a plurality of antenna elements, and a spacing between antenna elements causes a transmission delay. The transmission delay is represented as a phase difference in frequency domain, and a same transmission delay is represented as different phase differences for different frequency bands. Therefore, the same transmission delay is represented as different phase differences for different carriers. As a result, a same spatial domain transmit filter presents different beam gains on different carriers (that is, different frequency bands). This phenomenon is referred to as beam tilt.

It can be learned from (1) and (2) that when the plurality of carriers share one radio frequency channel, beams, of the plurality of carriers, that correspond to the same spatial domain transmit filter and that are simultaneously sent by using the radio frequency channel have different beam gains.

(3) When the plurality of carriers share one radio frequency channel, in the existing beam management method, beam management is performed independently on each of the plurality of carriers. Because a same spatial domain transmit filter presents different beam gains on different carriers, in a conventional solution, spatial domain transmit filters of beams reported by the terminal device for different carriers may be different.

For example, it is assumed that beam measurement results of the carrier 1, the carrier 2, and the carrier 3 obtained by the terminal device are shown in Table 1. It is assumed that the terminal device reports a beam with largest RSRP as an optimal beam to the network device. In Table 1, for the carrier 1, the terminal device reports, to the network device, a beam corresponding to a spatial domain transmit filter 3, for the carrier 2, the terminal device reports, to the network device, a beam corresponding to a spatial domain transmit filter 1, and for the carrier 3, the terminal device reports, to the network device, a beam corresponding to a spatial domain transmit filter 2.

TABLE 1

|  | Spatial domain transmit filter 1 | Spatial domain transmit filter 2 | Spatial domain transmit filter 3 |
| --- | --- | --- | --- |
| Carrier 1 | RSRP = −94 | RSRP = −90 | RSRP = −85 |
| Carrier 2 | RSRP = −80 | RSRP = −92 | RSRP = −96 |
| Carrier 3 | RSRP = −96 | RSRP = −82 | RSRP = −90 |

It is assumed that the carrier 1, the carrier 2, and the carrier 3 all belong to the FR2, and the carrier 1, the carrier 2, and the carrier 3 share one radio frequency channel. It is described above that one radio frequency channel can correspond to only one group of spatial domain transmit filters at a same moment. Therefore, for measurement report results that are of the carrier 1, the carrier 2, and the carrier 3 and that are reported by the terminal device in the example shown in Table 1, the network device needs to communicate with the terminal device on an optimal beam of each carrier in sequence. Therefore, the carrier 1, the carrier 2, and the carrier 3 cannot be simultaneously used to communicate with the terminal device.

Therefore, when the plurality of carriers share one radio frequency channel, an existing beam management solution may result in a fact that the network device cannot simultaneously use the plurality of carriers to serve users. Consequently, a user capacity is limited, and communication efficiency is reduced.

For the foregoing problem, this application proposes a measurement reporting method and an apparatus, so that when the plurality of carriers share one radio frequency channel, the network device can simultaneously use the plurality of carriers to serve users, thereby increasing the user capacity and improving the communication efficiency.

The technical solution in the embodiments of this application may be used in a 5G new radio (NR) communication system or another future evolved communication system that perform communication by using beams.

The embodiments of this application are applicable to a carrier aggregation scenario. For example, an application scenario of the embodiments of this application is a carrier aggregation scenario as shown in FIG. 1.

The terminal device in the embodiments of this application includes a handheld device, a vehicle-mounted device, a wearable device, or a computing device that has a wireless communication function. For example, the terminal device may be user equipment (UE), an access terminal, a subscriber unit, a subscriber station, a mobile station, a remote station, a remote terminal, a mobile device, a user terminal, a terminal, a wireless communication device, a user agent, or a user apparatus. For example, the terminal device may be a mobile phone (mobile phone), a tablet computer, or a computer with a wireless transceiver function. The terminal device may alternatively be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city (smart city), a wireless terminal in a smart home, or the like. The terminal device may be a terminal device in a 5G network, a terminal device in a future evolved public land mobile communication network (PLMN), or the like.

The network device in the embodiments of this application may be configured to communicate with one or more terminal devices, or may be configured to communicate with one or more base stations having some terminal functions (for example, communication between a macro base station and a micro base station, such as an access point). The network device may be referred to as a base station. The base station may be in a plurality of forms, for example, a macro base station, a micro base station, a relay station, and an access point. The network device may be a base station in a 5G system, a base station in a future evolved PLMN, or the like. A base station in 5G NR may also be referred to as a transmission reception point (TRP) or a next generation NodeB (gNB).

The pilot in the embodiments of this application represents a beam, and the pilot resource in the embodiments of this application represents a resource corresponding to the beam. It may be understood that the pilot and the beam are two mutually replaceable representations.

The "spatial domain transmit filter" in this specification may be replaced with "downlink spatial domain transmission filter", or may be replaced with any one of the following descriptions: "spatial domain filter", "analog beam", and "analog weight vector".

Figure 2:
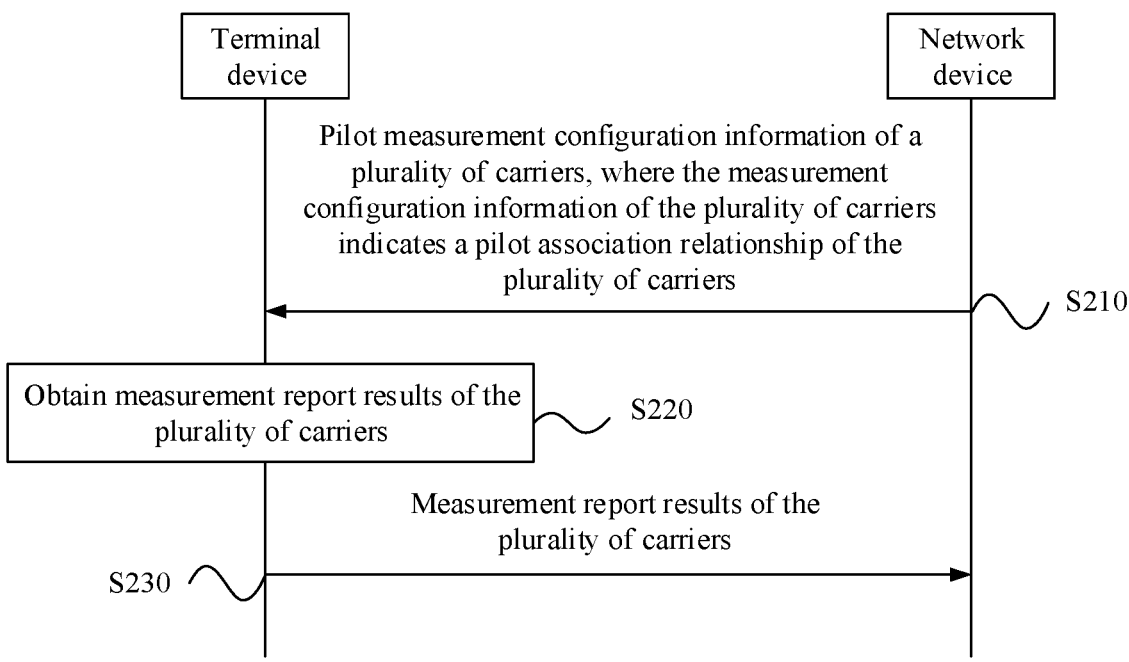
FIG. 2 is a schematic flowchart of a measurement reporting method according to an embodiment.

FIG. 2 is a schematic flowchart of a measurement reporting method according to an embodiment. The method includes the following operations.

S210: A network device sends pilot measurement configuration information of a plurality of carriers to a terminal device, where the pilot measurement configuration information of the plurality of carriers indicates a pilot association relationship of the plurality of carriers, and the pilot association relationship of the plurality of carriers indicates that pilots of the plurality of carriers correspond to a same spatial domain transmit filter.

As described above, the "spatial domain transmit filter" in this specification may be replaced with any one of the following descriptions: "downlink spatial domain transmission filter", "spatial domain filter", "analog beam", or "analog weight vector". For example, "the pilot association relationship of the plurality of carriers indicates that pilots of the plurality of carriers correspond to a same spatial domain transmit filter" in this embodiment of this application may be replaced with "the pilot association relationship of the plurality of carriers indicates that pilots of the plurality of carriers correspond to a same analog weight vector".

The pilot association relationship of the plurality of carriers indicates that the pilots of the plurality of carriers correspond to the same spatial domain transmit filter. In other words, the pilot association relationship of the plurality of carriers indicates an association relationship of a plurality of pilots corresponding to the same spatial domain transmit filter of the plurality of carriers.

For example, the plurality of carriers are a carrier 1, a carrier 2, and a carrier 3. The carrier 1, the carrier 2, and the carrier 3 all have a first spatial domain transmit filter. The pilot association relationship of the plurality of carriers may include an association relationship among a pilot that corresponds to the first spatial domain transmit filter and that is of the carrier 1, a pilot that corresponds to the first spatial domain transmit filter and that is of the carrier 2, and a pilot that corresponds to the first spatial domain transmit filter and that is of the carrier 3.

The pilot association relationship of the plurality of carriers may be implemented in a plurality of manners. Descriptions are provided below.

That the pilot measurement configuration information of the plurality of carriers indicates a pilot association relationship of the plurality of carriers indicates that: the pilot measurement configuration information of the plurality of carriers includes information that may indicate the pilot association relationship of the plurality of carriers.

In addition, the pilot measurement configuration information of the plurality of carriers may further include pilot measurement related configuration information and/or pilot reporting related configuration information that are/is of the plurality of carriers. The pilot measurement related configuration information may include information used to indicate a resource used to measure the pilot, and the like. The pilot reporting related configuration information may include information used to indicate a resource used to report a measurement result of the pilot.

In an embodiment, the network device may jointly configure the pilot measurement configuration information for the plurality of carriers.

For example, for the plurality of carriers, the network device configures one piece of pilot measurement configuration information, and the pilot measurement configuration information includes pilot measurement configuration information of each of the plurality of carriers.

In an embodiment, the network device may separately configure the pilot measurement configuration information for each of the plurality of carriers.

For example, for each of the plurality of carriers, the network device separately configures one piece of pilot measurement configuration information.

S220: The terminal device performs measurement based on the pilot measurement configuration information of the plurality of carriers, to obtain measurement report results of the plurality of carriers.

For example, the network device sends the pilots of the plurality of carriers based on the pilot measurement configuration information of the plurality of carriers, where each carrier may have one or more pilots. The terminal device receives and measures the pilots of the plurality of carriers based on the pilot measurement configuration information of the plurality of carriers, and obtains the measurement report results of the plurality of carriers based on measurement results of the pilots of the plurality of carriers.

The measurement results of the pilots may be represented by any one of the following indicators: RSRP, RSRQ, an RSSI, an SNR, an SINR, a BLER, and a CQI.

S230: The terminal device sends the measurement report results of the plurality of carriers to the network device.

It should be understood that, because the pilot measurement configuration information of the plurality of carriers indicates the pilot association relationship of the plurality of carriers, the terminal device may obtain the pilot association relationship of the plurality of carriers based on the received pilot measurement configuration information of the plurality of carriers, so that the terminal device may report, for the plurality of carriers, measurement results of pilots corresponding to one or more same spatial domain transmit filters. After receiving the measurement report results of the plurality of carriers, the network device may communicate with the terminal device based on the pilots that correspond to the same spatial domain transmit filter and that are of the plurality of carriers. Therefore, when the plurality of carriers share one radio frequency channel, the network device can simultaneously use the plurality of carriers to communicate with the terminal device according to the solution provided in this application.

Therefore, in the solution provided in this application, the pilot association relationship of the plurality of carriers is configured for the terminal device, so that the terminal device may report, for the plurality of carriers, the measurement results of the pilots corresponding to the one or more same spatial domain transmit filters. In this way, when the plurality of carriers share one radio frequency channel, the network device can simultaneously use the plurality of carriers to communicate with the terminal device, that is, communication based on carrier aggregation is implemented. Therefore, communication efficiency can be improved.

The carriers in the embodiments of this application may be component carriers (CC), or may be bandwidth parts (BWP).

For example, the plurality of carriers are a plurality of CCs, or the plurality of carriers are a plurality of BWPs.

The plurality of carriers may belong to a same frequency band, or may belong to different frequency bands. For example, the plurality of carriers belong to a same frequency band in the FR2, or belong to different frequency bands in the FR2.

As described above, the pilot association relationship of the plurality of carriers may be implemented in a plurality of manners. Descriptions are provided below.

In embodiment 1, the pilot association relationship of the plurality of carriers includes: Resource identifiers of pilots that correspond to a same spatial domain transmit filter and that are of the plurality of carriers are the same, or resource identifiers of pilots that correspond to a same analog weight vector and that are of the plurality of carriers are the same.

It should be understood that after receiving the pilot measurement configuration information that is of the plurality of carriers and that is sent by the network device, the terminal device may learn that pilots with a same resource identifier correspond to a same spatial domain transmit filter, or a same analog weight vector.

For example, it may be specified in a protocol that, pilots with a same resource identifier correspond to a same spatial domain transmit filter, or a same analog weight vector. Alternatively, it may be indicated, by using one piece of indication information in the pilot measurement configuration information of the plurality of carriers, that pilots with a same resource identifier correspond to a same spatial domain transmit filter, or a same analog weight vector.

An example is shown with reference to Table 2. For example, the plurality of carriers are a carrier 1, a carrier 2, and a carrier 3. Pilot measurement configuration information of the carrier 1, the carrier 2, and the carrier 3 includes information shown in Table 2.

TABLE 2

| A plurality of carriers | Pilot of a carrier | Resource identifier of a pilot |
| --- | --- | --- |
| Carrier 1 | Pilot 11 | CSI resource configuration identifier (CSI-ResourceConfigId) #0 |

TABLE 2-continued

| A plurality of carriers | Pilot of a carrier | Resource identifier of a pilot |
|---|---|---|
| | Pilot 12 | CSI-ResourceConfigId #1 |
| | Pilot 13 | CSI-ResourceConfigId #2 |
| Carrier 2 | Pilot 21 | CSI-ResourceConfigId #0 |
| | Pilot 22 | CSI-ResourceConfigId #1 |
| | Pilot 23 | CSI-ResourceConfigId #2 |
| Carrier 3 | Pilot 31 | CSI-ResourceConfigId #0 |
| | Pilot 32 | CSI-ResourceConfigId #1 |
| | Pilot 33 | CSI-ResourceConfigId #2 |

It can be learned from Table 2 that, the resource identifier of the pilot 11 of the carrier 1, the resource identifier of the pilot 21 of the carrier 2, and the resource identifier of the pilot 31 of the carrier 3 are the same. It indicates that the pilot 11, the pilot 21, and the pilot 31 correspond to a same spatial domain transmit filter. That the resource identifier of the pilot 12 of the carrier 1, the resource identifier of the pilot 22 of the carrier 2, and the resource identifier of the pilot 32 of the carrier 3 are the same indicates that the pilot 12, the pilot 22, and the pilot 32 correspond to a same spatial domain transmit filter. That the resource identifier of the pilot 13 of the carrier 1, the resource identifier of the pilot 23 of the carrier 2, and the resource identifier of the pilot 33 of the carrier 3 are the same indicates that the pilot 13, the pilot 23, and the pilot 33 correspond to a same spatial domain transmit filter.

It should be understood that, Table 2 shows only some information in the pilot measurement configuration information of the plurality of carriers, and the pilot measurement configuration information of the plurality of carriers may further include other necessary configuration information.

In an embodiment in which a spatial domain transmit filter association relationship between the pilots of the plurality of carriers is indicated by using the pilot measurement configuration information of the plurality of carriers in the embodiment 1, the resource identifier of the pilot may be any one of the following: a resource index, a resource set identifier, and a resource port identifier.

For example, CSI-ResourceConfigId in Table 2 may alternatively be any one of the following: SSB-Index, CSI-SSB-ResourceSetId, NZP-CSI-RS-ResourceSetId, CSI-IM-ResourceSetId, NZP-CSI-RS-ResourceId, portID, and reportConfigId.

SSB-Index indicates an SSB resource index; CSI-SSB-ResourceSetId indicates a CSI-SSB resource set identifier; NZP-CSI-RS-ResourceSetId indicates an NZP-CSI-RS resource set identifier; CSI-IM-ResourceSetId indicates a CSI-IM resource set identifier; NZP-CSI-RS-ResourceId indicates an NZP-CSI-RS resource identifier; and portID indicates a port identifier.

NZP-CSI-RS indicates a non-zero power channel state information-reference signal (NZP-CSI-RS). CSI-IM indicates channel state information-interference measurement (CSI-IM).

It should be understood that, in this embodiment, original information in the pilot measurement configuration information is multiplexed to indicate the pilot association relationship of the plurality of carriers, so that signaling utilization can be improved, and signaling overheads can be reduced.

In embodiment 2, the pilot association relationship of the plurality of carriers includes: Resources of pilots that correspond to a same spatial domain transmit filter and that are of the plurality of carriers have an intersection, or resources of pilots that correspond to a same analog weight vector and that are of the plurality of carriers have an intersection.

It should be understood that after receiving the pilot measurement configuration information that is of the plurality of carriers and that is sent by the network device, the terminal device may learn that pilots with resources having an intersection correspond to a same spatial domain transmit filter, or a same analog weight vector.

For example, it may be specified in a protocol that, pilots with resources having an intersection correspond to a same spatial domain transmit filter, or a same analog weight vector. Alternatively, it may be indicated, by using one piece of indication information in the pilot measurement configuration information of the plurality of carriers, that pilots with resources having an intersection correspond to a same spatial domain transmit filter, or a same analog weight vector.

The resources having an intersection in this specification may include resources having an intersection in frequency domain, and/or resources having an intersection in time domain.

The resources having an intersection in this specification may include completely overlapping resources, or may include partially overlapping resources.

Figure 3:
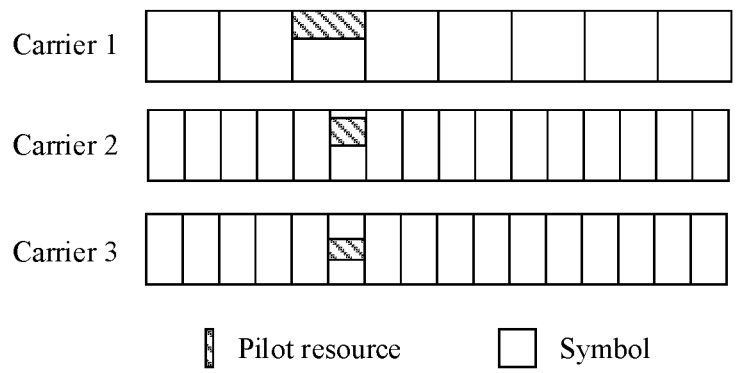
FIG. 3 is a schematic diagram of indicating a pilot association relationship of a plurality of carriers by using resources of pilots according to an embodiment.

An example is shown with reference to FIG. 3. For example, the plurality of carriers are a carrier 1, a carrier 2, and a carrier 3. FIG. 3 is a schematic diagram of pilot resources that are of the carrier 1, the carrier 2, and the carrier 3 and that are indicated by using pilot measurement configuration information of the carrier 1, the carrier 2, and the carrier 3. It can be learned from FIG. 3 that, symbol locations of a pilot resource (denoted as a corresponding pilot 2x) of the carrier 2 and a pilot resource (denoted as a corresponding pilot 3x) of the carrier 3 completely overlap, and symbol locations of a pilot resource (denoted as a corresponding pilot 1x) of the carrier 1 and the pilot resource (denoted as the corresponding pilot 2x) of the carrier 2 partially overlap. It indicates that the pilot 1x of the carrier 1, the pilot 2x of the carrier 2, and the pilot 3x of the carrier 3 correspond to a same spatial domain transmit filter.

It should be understood that, in this embodiment, the resources of the pilots are used to indicate the pilot association relationship of the plurality of carriers, so that signaling overheads can be reduced.

In embodiment 3, the pilot association relationship of the plurality of carriers includes: Reporting resources of pilots that correspond to a same spatial domain transmit filter and that are of the plurality of carriers are the same, or reporting resources of pilots that correspond to a same analog weight vector and that are of the plurality of carriers are the same.

It should be understood that after receiving the pilot measurement configuration information that is of the plurality of carriers and that is sent by the network device, the terminal device may learn that pilots with a same reporting resource correspond to a same spatial domain transmit filter, or a same analog weight vector.

For example, it may be specified in a protocol that, pilots with a same reporting resource correspond to a same spatial domain transmit filter, or a same analog weight vector. Alternatively, it may be indicated, by using one piece of indication information in the pilot measurement configuration information of the plurality of carriers, that pilots with a same reporting resource correspond to a same spatial domain transmit filter, or a same analog weight vector.

An example is shown with reference to Table 3. For example, the plurality of carriers are a carrier 1, a carrier 2, and a carrier 3. Pilot measurement configuration information of the carrier 1, the carrier 2, and the carrier 3 includes information shown in Table 3.

TABLE 3

| A plurality of carriers | Pilot of a carrier | Report configuration information of a pilot |
| --- | --- | --- |
| Carrier 1 | Pilot 11 | PUCCH resource identifier (PUCCH-ResourceId) #0 |
|  | Pilot 12 | PUCCH-ResourceId #1 |
|  | Pilot 13 | PUCCH-ResourceId #2 |
| Carrier 2 | Pilot 21 | PUCCH-ResourceId #0 |
|  | Pilot 22 | PUCCH-ResourceId #1 |
|  | Pilot 23 | PUCCH-ResourceId #2 |
| Carrier 3 | Pilot 31 | PUCCH-ResourceId #0 |
|  | Pilot 32 | PUCCH-ResourceId #1 |
|  | Pilot 33 | PUCCH-ResourceId #2 |

It can be learned from Table 3 that, the reporting resources of the pilot 11 of the carrier 1, the pilot 21 of the carrier 2, and the pilot 31 of the carrier 3 are the same. It indicates that the pilot 11, the pilot 21, and the pilot 31 correspond to a same spatial domain transmit filter. That the reporting resources of the pilot 12 of the carrier 1, the pilot 22 of the carrier 2, and the pilot 32 of the carrier 3 are the same indicates that the pilot 12, the pilot 22, and the pilot 32 correspond to a same spatial domain transmit filter. That the reporting resources of the pilot 13 of the carrier 1, the pilot 23 of the carrier 2, and the pilot 33 of the carrier 3 are the same indicates that the pilot 13, the pilot 23, and the pilot 33 correspond to a same spatial domain transmit filter.

It should be understood that, Table 3 shows only some information in the pilot measurement configuration information of the plurality of carriers, and the pilot measurement configuration information of the plurality of carriers may further include other necessary configuration information.

It should be understood that, in this embodiment, the reporting resource of the pilot is used to indicate the pilot association relationship of the plurality of carriers, that is, information originally included in the pilot measurement configuration information is multiplexed to indicate the pilot association relationship of the plurality of carriers, so that signaling utilization can be improved, and signaling overheads can be reduced.

In embodiment 4, the pilot measurement configuration information of the plurality of carriers includes a spatial domain transmit filter identifier of the pilot, and the pilot association relationship of the plurality of carriers includes: Spatial domain transmit filter identifiers of pilots that correspond to a same spatial domain transmit filter and that are of the plurality of carriers are the same.

Alternatively, the pilot measurement configuration information of the plurality of carriers includes an analog weight vector identifier of the pilot, and the pilot association relationship of the plurality of carriers includes: Analog weight vector identifiers of pilots of a same analog weight vector of the plurality of carriers are the same.

After receiving the pilot measurement configuration information that is of the plurality of carriers and that is sent by the network device, the terminal device may learn that pilots with a same spatial domain transmit filter identifier correspond to a same spatial domain transmit filter, or pilots with a same analog weight vector identifier correspond to a same analog weight vector.

An example is shown with reference to Table 4. For example, the plurality of carriers are a carrier 1, a carrier 2, and a carrier 3. Pilot measurement configuration information of the carrier 1, the carrier 2, and the carrier 3 includes information shown in Table 4.

TABLE 4

| A plurality of carriers | Pilot of a carrier | Spatial domain transmit filter identifier |
| --- | --- | --- |
| Carrier 1 | Pilot 11 | Spatial domain transmit filter (STF) #0 |
|  | Pilot 12 | STF#1 |
|  | Pilot 13 | STF#2 |
| Carrier 2 | Pilot 21 | STF#0 |
|  | Pilot 22 | STF#1 |
|  | Pilot 23 | STF#2 |
| Carrier 3 | Pilot 31 | STF#0 |
|  | Pilot 32 | STF#1 |
|  | Pilot 33 | STF#2 |

It can be learned from Table 4 that, the spatial domain transmit filter identifier of the pilot 11 of the carrier 1, the spatial domain transmit filter identifier of the pilot 21 of the carrier 2, and the spatial domain transmit filter identifier of the pilot 31 of the carrier 3 are the same. It indicates that the pilot 11, the pilot 21, and the pilot 31 correspond to a same spatial domain transmit filter. That the spatial domain transmit filter identifier of the pilot 12 of the carrier 1, the spatial domain transmit filter identifier of the pilot 22 of the carrier 2, and the spatial domain transmit filter identifier of the pilot 32 of the carrier 3 are the same indicates that the pilot 12, the pilot 22, and the pilot 32 correspond to a same spatial domain transmit filter. That the spatial domain transmit filter identifier of the pilot 13 of the carrier 1, the spatial domain transmit filter identifier of the pilot 23 of the carrier 2, and the spatial domain transmit filter identifier of the pilot 33 of the carrier 3 are the same indicates that the pilot 13, the pilot 23, and the pilot 33 correspond to a same spatial domain transmit filter.

It should be understood that, Table 4 shows only some information in the pilot measurement configuration information of the plurality of carriers, and the pilot measurement configuration information of the plurality of carriers may further include other necessary configuration information.

In an embodiment, the pilot association relationship of the plurality of carriers may include any one or more of the foregoing embodiment 1, embodiment 2, embodiment 3, and embodiment 4.

In addition to the foregoing embodiment 1, embodiment 2, embodiment 3, and embodiment 4, there may be another embodiment for the pilot association relationship of the plurality of carriers.

It should be understood that, because the pilot measurement configuration information of the plurality of carriers indicates the pilot association relationship of the plurality of carriers, the terminal device may obtain the pilot association relationship of the plurality of carriers based on the received pilot measurement configuration information of the plurality of carriers, so that the terminal device may report, for the plurality of carriers, the measurement results of the pilots corresponding to the one or more same spatial domain transmit filters.

The following describes a policy of the terminal device for reporting the measurement report results of the plurality of carriers.

In the embodiment shown in FIG. 2, the measurement report results of the plurality of carriers include measurement results of a plurality of pilots corresponding to the same spatial domain transmit filter, where the plurality of pilots are pilots of the plurality of carriers.

That the plurality of pilots are pilots of the plurality of carriers means that the plurality of pilots include one pilot included in each of the plurality of carriers.

It is assumed that the plurality of carriers are three carriers. Measurement report results of the three carriers include a measurement result of one pilot of each of the three carriers, that is, include measurement results of three pilots, where the three pilots correspond to the same spatial domain transmit filter.

The measurement result of the pilot may include a pilot measurement value. The pilot measurement value may be represented by any one of the following indicators: RSRP, RSRQ, an RSSI, an SNR, an SINR, a BLER, and a CQI. The measurement result of the pilot may further include a pilot identifier.

Table 1 is used as an example. The plurality of carriers are the carrier 1, the carrier 2, and the carrier 3 shown in Table 1. The terminal device reports, to the network device, RSRP of pilots that correspond to the spatial domain transmit filter 1 and that are of the carrier 1, the carrier 2, and the carrier 3. Alternatively, the terminal device reports, to the network device, RSRP of pilots that correspond to the spatial domain transmit filter 2 and that are of the carrier 1, the carrier 2, and the carrier 3. Alternatively, the terminal device reports, to the network device, RSRP of pilots that correspond to the spatial domain transmit filter 3 and that are of the carrier 1, the carrier 2, and the carrier 3.

The pilot association relationship of the plurality of carriers is configured for the terminal device, so that the terminal device may report, for the plurality of carriers, the measurement results of the pilots corresponding to the same spatial domain transmit filter. In this way, when the plurality of carriers share one radio frequency channel, the network device can simultaneously use the plurality of carriers to communicate with the terminal device, that is, communication based on carrier aggregation is implemented. Therefore, communication efficiency can be improved.

In an embodiment, the measurement report results of the plurality of carriers may include the measurement results of the pilots that correspond to the one or more same spatial domain transmit filters and that are of the plurality of carriers.

Table 1 is still used as an example. The terminal device reports, to the network device, RSRP of pilots that correspond to the spatial domain transmit filter 1 and the spatial domain transmit filter 2 and that are of the carrier 1, the carrier 2, and the carrier 3. Alternatively, the terminal device reports, to the network device, RSRP of pilots that correspond to the spatial domain transmit filter 1 and the spatial domain transmit filter 3 and that are of the carrier 1, the carrier 2, and the carrier 3. Alternatively, the terminal device reports, to the network device, RSRP of pilots that correspond to the spatial domain transmit filter 2 and the spatial domain transmit filter 3 and that are of the carrier 1, the carrier 2, and the carrier 3. Alternatively, the terminal device reports, to the network device, RSRP of pilots that correspond to the spatial domain transmit filter 1, the spatial domain transmit filter 2, and the spatial domain transmit filter 3 and that are of the carrier 1, the carrier 2, and the carrier 3.

The pilot association relationship of the plurality of carriers is configured for the terminal device, so that the terminal device may report, for the plurality of carriers, the measurement results of the pilots corresponding to the one or more same spatial domain transmit filters. In this way, when the plurality of carriers share one radio frequency channel, the network device can simultaneously use the plurality of carriers to communicate with the terminal device, that is, communication based on carrier aggregation is implemented, and communication efficiency can be improved.

In an embodiment, in a first policy, the measurement report results of the plurality of carriers include measurement results of a plurality of pilots corresponding to a same spatial domain transmit filter, where the plurality of pilots are pilots of the plurality of carriers, and the plurality of pilots include a pilot with an optimal measurement value.

That the plurality of pilots are pilots of the plurality of carriers means that the plurality of pilots include one pilot included in each of the plurality of carriers.

That the plurality of pilots include a pilot with an optimal measurement value means that the plurality of pilots include a pilot with an optimal measurement value in all pilots of the plurality of carriers.

In other words, providing that to-be-reported pilots of carriers correspond to a same spatial domain transmit filter, a pilot with an optimal measurement result of the pilot is selected for reporting.

It is assumed that the plurality of carriers are a carrier 1, a carrier 2, and a carrier 3, and each of the three carriers have three pilots corresponding to a spatial domain transmit filter 1, a spatial domain transmit filter 2, and a spatial domain transmit filter 3. It is assumed that a measurement value of a pilot that corresponds to the spatial domain transmit filter 1 and that is of the carrier 1 is optimal, measurement report results of the three carriers include measurement results of pilots that correspond to the spatial domain transmit filter 1 and that are of the carrier 1, the carrier 2, and the carrier 3.

Table 1 is used as an example. It is assumed that the plurality of carriers are the carrier 1, the carrier 2, and the carrier 3 shown in Table 1. It can be learned from Table 1 that, in all measured pilots, a pilot that corresponds to the spatial domain transmit filter 1 and that is of the carrier 2 has largest RSRP. In this case, the measurement report results of the plurality of carriers include measurement results of pilots that correspond to the spatial domain transmit filter 1 and that are of the carrier 1, the carrier 2, and the carrier 3.

It can also be learned from Table 1 that RSRP of a pilot that corresponds to the spatial domain transmit filter 2 and that is of the carrier 3 is the second largest. In an embodiment, the measurement report results of the plurality of carriers may include measurement results of pilots that correspond to the spatial domain transmit filter 1 and the spatial domain transmit filter 2 and that are of the carrier 1, the carrier 2, and the carrier 3.

An operation in which the terminal device reports the measurement report results of the plurality of carriers by using the first policy may be further expressed as that the terminal device reports top N optimal pilots based on carrier levels, where N is a positive integer.

In an embodiment, in a second policy, the measurement report results of the plurality of carriers include measurement results of a plurality of pilots corresponding to a same spatial domain transmit filter, where the plurality of pilots are pilots of the plurality of carriers, and the same spatial domain transmit filter corresponding to the plurality of pilots is a spatial domain transmit filter with an optimal pilot average measurement value.

That the plurality of pilots are pilots of the plurality of carriers means that the plurality of pilots include one pilot included in each of the plurality of carriers.

The pilot average measurement value in this specification is for the spatial domain transmit filter. Each spatial domain transmit filter of the plurality of carriers corresponds to one pilot average measurement value. For example, a pilot average measurement value of a first spatial domain transmit filter refers to an average value of measurement values of a plurality of pilots corresponding to the first spatial domain transmit filter in all pilots of the plurality of carriers.

It is assumed that the plurality of carriers are a carrier 1, a carrier 2, and a carrier 3, and each of the three carriers have three pilots corresponding to a spatial domain transmit filter 1, a spatial domain transmit filter 2, and a spatial domain transmit filter 3. It is assumed that an average measurement value of three pilots corresponding to the spatial domain transmit filter 1 is optimal, measurement report results of the three carriers include measurement results of pilots that correspond to the spatial domain transmit filter 1 and that are of the carrier 1, the carrier 2, and the carrier 3.

Table 1 is still used as an example. It is assumed that the plurality of carriers are the carrier 1, the carrier 2, and the carrier 3 shown in Table 1. It can be learned from Table 1 that, in the spatial domain transmit filters (the spatial domain transmit filter 1, the spatial domain transmit filter 2, and the spatial domain transmit filter 3) of the carrier 1, the carrier 2, and the carrier 3, an average value of RSRP of pilots corresponding to the spatial domain transmit filter 2 is the largest, an average value of RSRP of pilots corresponding to the spatial domain transmit filter 1 is the second largest, and an average value of RSRP of pilots corresponding to the spatial domain transmit filter 3 is the smallest. In an embodiment, the measurement report results of the plurality of carriers include measurement results of pilots that correspond to the spatial domain transmit filter 2 and that are of the carrier 1, the carrier 2, and the carrier 3. In an embodiment, the measurement report results of the plurality of carriers include measurement results of pilots that correspond to the spatial domain transmit filter 2 and the spatial domain transmit filter 1 and that are of the carrier 1, the carrier 2, and the carrier 3.

An operation in which the terminal device reports the measurement report results of the plurality of carriers by using the second policy may be further expressed as that the terminal device reports first N pilots that are averagely optimal and that are of the plurality of carriers, where N is a positive integer.

It should be understood that, in addition to the first policy and the second policy, the terminal device further determines the measurement report results of the plurality of carriers by using another feasible policy, provided that the measurement results of the pilots that are of the plurality of carriers and that correspond to the same spatial domain transmit filter are reported.

In an embodiment, the measurement report results of the plurality of carriers include at least one of the following: a carrier identifier, a pilot measurement value, and a pilot identifier.

For example, in the embodiment in which the terminal device reports the measurement report results of the plurality of carriers by using the first policy, in an example, the measurement report results of the carrier 1, the carrier 2, and the carrier 3 include the following information: a carrier identifier of the carrier 1, RSRP and a resource identifier of a pilot that corresponds to the spatial domain transmit filter 2 and that is of the carrier 1, a carrier identifier of the carrier 2, RSRP and a resource identifier of a pilot that corresponds to the spatial domain transmit filter 2 and that is of the carrier 2, a carrier identifier of the carrier 3, and RSRP and a resource identifier of a pilot that corresponds to the spatial domain transmit filter 2 and that is of the carrier 3.

In this application, the measurement report results of the plurality of carriers may be reported in a plurality of manners.

In some embodiments, in operation S230, the terminal device may perform joint reporting for the plurality of carriers.

For example, the terminal device reports one measurement report result to the network device, and the measurement report result includes a measurement result of a pilot of one or more carriers.

In the embodiment in which the terminal device reports the measurement report results of the plurality of carriers by using the first policy, Table 1 is used as an example. It can be learned from Table 1 that, RSRP of the pilot that corresponds to the spatial domain transmit filter 1 and that is of the carrier 2 is the largest, and RSRP of the pilot that corresponds to the spatial domain transmit filter 1 and that is of the carrier 1 is larger than RSRP of the pilot that corresponds to the spatial domain transmit filter 1 and that is of the carrier 3.

If the measurement report result includes a resource identifier of one spatial domain transmit filter and a measurement result of one carrier, the measurement report result includes: a carrier identifier of the carrier 2, a resource identifier of a pilot that corresponds to the spatial domain transmit filter 1 and that is of the carrier 2, and an RSRP value of the pilot that corresponds to the spatial domain transmit filter 1 and that is of the carrier 2.

If the measurement report result includes a resource identifier of one spatial domain transmit filter and measurement results of two carriers, the measurement report result includes: a carrier identifier of the carrier 2, a resource identifier of a pilot that corresponds to the spatial domain transmit filter 1 and that is of the carrier 2, an RSRP value of a pilot that corresponds to the spatial domain transmit filter 1 and that is of the carrier 2, a carrier identifier of the carrier 1, a resource identifier of a pilot that corresponds to the spatial domain transmit filter 1 and that is of the carrier 1, and an RSRP value of a pilot that corresponds to the spatial domain transmit filter 1 and that is of the carrier 1.

If the measurement report result includes a resource identifier of one spatial domain transmit filter and measurement results of three carriers, the measurement report result includes: a carrier identifier of the carrier 2, a resource identifier of a pilot that corresponds to the spatial domain transmit filter 1 and that is of the carrier 2, an RSRP value of a pilot that corresponds to the spatial domain transmit filter 1 and that is of the carrier 2, a carrier identifier of the carrier 1, a resource identifier of a pilot that corresponds to the spatial domain transmit filter 1 and that is of the carrier 1, an RSRP value of a pilot that corresponds to the spatial domain transmit filter 1 and that is of the carrier 1, a carrier identifier of the carrier 3, a resource identifier of a pilot that corresponds to the spatial domain transmit filter 1 and that is of the carrier 3, and an RSRP value of a pilot that corresponds to the spatial domain transmit filter 1 and that is of the carrier 3.

If the measurement report result includes resource identifiers of two spatial domain transmit filters and measurement results of three carriers, the measurement report result includes: carrier identifiers of the carrier 1, carrier 2, and carrier 3, resource identifiers of pilots that correspond to the spatial domain transmit filters 1 and the spatial domain transmit filters 2 and that are of the carrier 1, carrier 2, and carrier 3, and RSRP values of pilots that correspond to the spatial domain transmit filters 1 and the spatial domain transmit filters 2 and that are of the carrier 1, carrier 2, and carrier 3.

It should be noted that a quantity of resource identifiers of spatial domain transmit filters and a quantity of reported carriers that are included in the measurement report result may be indicated by the network device, or may be determined by the terminal device.

In some embodiments, in operation S230, the terminal device may perform separate reporting for each or a part of the plurality of carriers. For example, in a reporting operation, the terminal device reports a measurement report result of one of the plurality of carriers; in another reporting operation, the terminal device reports a measurement report result of another of the plurality of carriers; and others may be deduced by analogy.

For another example, in a reporting operation, the terminal device reports measurement report results of a part of the plurality of carriers; in another reporting operation, the terminal device reports measurement report results of a remaining part of the plurality of carriers; and others may be deduced by analogy.

For example, in the example in Table 1, in a reporting operation, the terminal device reports, to the network device, a carrier identifier of the carrier 1, a resource identifier of a pilot that corresponds to the spatial domain transmit filter 1 and that is of the carrier 1, and an RSRP value of the pilot that corresponds to the spatial domain transmit filter 1 and that is of the carrier 1; in another reporting operation, the terminal device reports, to the network device, a carrier identifier of the carrier 2, a resource identifier of a pilot that corresponds to the spatial domain transmit filter 1 and that is of the carrier 2, and an RSRP value of the pilot that corresponds to the spatial domain transmit filter 1 and that is of the carrier 2; and in still another reporting operation, the terminal device reports, to the network device, a carrier identifier of the carrier 3, a resource identifier of a pilot that corresponds to the spatial domain transmit filter 1 and that is of the carrier 3, and an RSRP value of the pilot that corresponds to the spatial domain transmit filter 1 and that is of the carrier 3.

For another example, in the example in Table 1, in a reporting operation, the terminal device reports, to the network device, a carrier identifier of the carrier 1, a resource identifier of a pilot that corresponds to the spatial domain transmit filter 1 and that is of the carrier 1, an RSRP value of a pilot that corresponds to the spatial domain transmit filter 1 and that is of the carrier 1, a carrier identifier of the carrier 2, a resource identifier of a pilot that corresponds to the spatial domain transmit filter 1 and that is of the carrier 2, and an RSRP value of a pilot that corresponds to the spatial domain transmit filter 1 and that is of the carrier 2; and in another reporting operation, the terminal device reports, to the network device, a carrier identifier of the carrier 3, a resource identifier of a pilot that corresponds to the spatial domain transmit filter 1 and that is of the carrier 3, and an RSRP value of the pilot that corresponds to the spatial domain transmit filter 1 and that is of the carrier 3. In an embodiment, the plurality of reporting operations in this example may be performed simultaneously, or may be performed at different moments.

In some embodiments, in operation S230, the terminal device may alternatively report measurement results of a part of the plurality of carriers configured by the network device.

In the embodiment shown in FIG. 2, the method further includes: After receiving the measurement report results of the plurality of carriers, the network device determines, from the measurement report results of the plurality of carriers, pilots that are used for communication and that are of the plurality of carriers, where the pilots that are used for communication and that are of the plurality of carriers correspond to the same spatial domain transmit filter; and sends signals based on the same spatial domain transmit filter of the plurality of carriers, to perform communication based on carrier aggregation with the terminal device.

Therefore, in the solution provided in this application, the pilot association relationship of the plurality of carriers is configured for the terminal device, so that the terminal device may report, for the plurality of carriers, the measurement results of the plurality of pilots corresponding to the same spatial domain transmit filter. In this way, when the plurality of carriers share one radio frequency channel, the network device can simultaneously use the plurality of carriers to communicate with the terminal device, that is, communication based on carrier aggregation is implemented, and communication efficiency can be improved.

Figure 4:
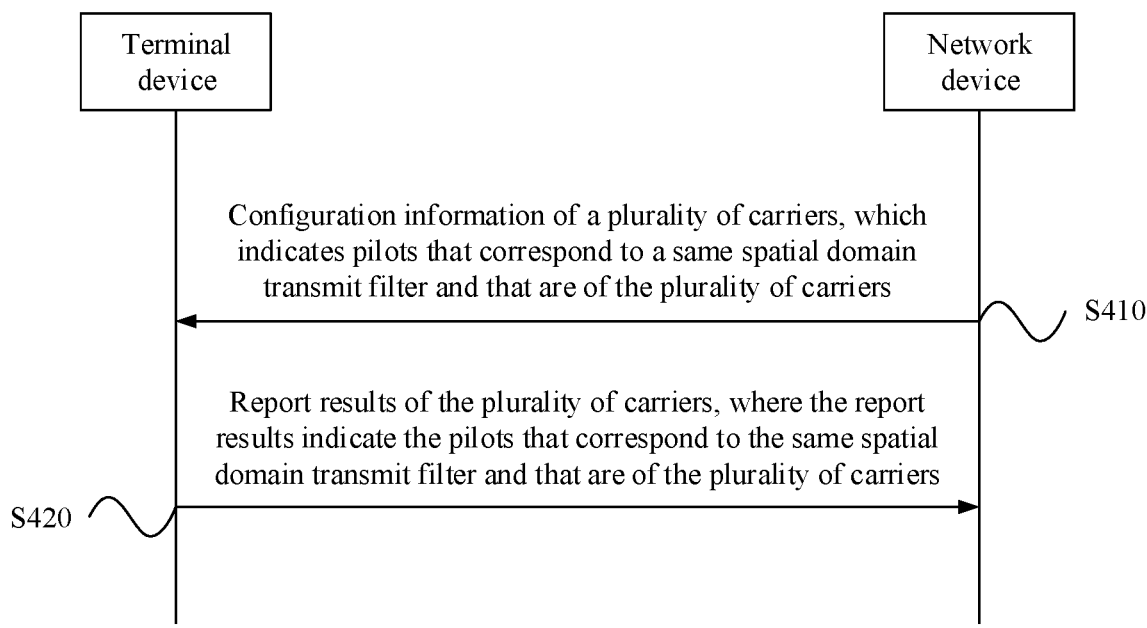
FIG. 4 is a schematic flowchart of a measurement reporting method according to another embodiment.

FIG. 4 is a schematic flowchart of a measurement reporting method according to another embodiment. The method includes operation S410 and operation S420.

S410: A network device sends configuration information of a plurality of carriers to a terminal device, where the configuration information indicates pilots that correspond to a same spatial domain transmit filter and that are of the plurality of carriers.

S420: The terminal device sends report results of the plurality of carriers to the network device based on the configuration information of the plurality of carriers, where the report results indicate the pilots that correspond to the same spatial domain transmit filter and that are of the plurality of carriers.

After receiving the report results that are of the plurality of carriers and that are sent by the terminal device, the network device may communicate with the terminal device by using the plurality of carriers simultaneously based on a plurality of pilots (which are pilots of the plurality of carriers) corresponding to the same spatial domain transmit filter. Therefore, when a plurality of carriers share one radio frequency channel, the network device can simultaneously use the plurality of carriers to communicate with the terminal device in this embodiment, so that a user capacity can be increased, and communication efficiency can be improved.

In operation S420, the terminal device may send the report results of the plurality of carriers to the network device by measuring the pilots of the plurality of carriers, where the report results may include measurement results of the plurality of pilots corresponding to the same spatial domain transmit filter. Alternatively, the terminal device may directly select, based on the configuration information of the plurality of carriers, the plurality of pilots that correspond to the same spatial domain transmit filter and that are of the plurality of carriers, for reporting.

An embodiment of operation S410 is operation S210 in the foregoing embodiments, that is, the configuration information of the plurality of carriers in operation S410 is pilot measurement configuration information of the plurality of carriers; and an embodiment of operation S420 is operations S220 and S230 in the foregoing embodiments, that is, the report results of the plurality of carriers in operation S420 is measurement report results of the plurality of carriers.

An embodiment of operation S410 is operation S210 in the foregoing embodiments, that is, the configuration information of the plurality of carriers in operation S410 is pilot measurement configuration information of the plurality of carriers; and an embodiment of operation S420 includes: performing measurement on a part or all of the pilots of the plurality of carriers based on the pilot measurement configuration information of the plurality of carriers, to determine a target pilot; and sending the report results of the plurality of carriers to the network device, where the report results indicate a plurality of pilots corresponding to the same spatial domain transmit filter (denoted as a target spatial domain transmit filter), the plurality of pilots are pilots of the plurality of carriers, and the target spatial domain transmit filter is a spatial domain transmit filter corresponding to the target pilot.

The target pilot may be a pilot with an optimal measurement value in all pilots of the plurality of carriers, or the target pilot may be a pilot with an optimal measurement value in a part of pilots (for example, 50% of pilots) of the plurality of carriers, or the target pilot may be a pilot whose measurement value exceeds a threshold.

An embodiment of operation S410 includes but is not limited to operation S210 in the foregoing embodiments, provided that the configuration information of the plurality of carriers may indicate the pilots that correspond to the same spatial domain transmit filter and that are of the plurality of carriers; and an embodiment of operation S420 includes: The terminal device directly selects, based on the configuration information of the plurality of carriers, the plurality of pilots corresponding to the same spatial domain transmit filter, and reports the plurality of pilots to the network device.

Therefore, in the embodiments of this application, the pilots that correspond to the same spatial domain transmit filter and that are of the plurality of carriers are configured for the terminal device, so that the terminal device reports, to the network device, the pilots of the same spatial domain transmit filter of the plurality of carriers. In this way, when the plurality of carriers share one radio frequency channel, the network device can simultaneously use the plurality of carriers to communicate with the terminal device, that is, communication based on carrier aggregation is implemented, and communication efficiency can be improved.

The embodiments described in this specification may be independent solutions, or may be combined based on internal logic. These solutions all fall within the protection scope of this application.

It may be understood that, in the foregoing method embodiments, the methods and the operations implemented by the terminal device may alternatively be implemented by a component (for example, a chip or a circuit) that may be used in the terminal device, and the methods and the operations implemented by the network device may alternatively be implemented by a component (for example, a chip or a circuit) that may be used in the network device.

The foregoing describes the method embodiments provided in the embodiments of this application, and the following describes apparatus embodiments provided in the embodiments of this application. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes, from the perspective of interaction between devices, the solutions provided in the embodiments of this application. It may be understood that, to implement the foregoing functions, each device, such as a transmit-end device or a receive-end device, includes a corresponding hardware structure and/or software module for performing each function. A person skilled in the art should be aware that, with reference to the examples described in the embodiments disclosed in this specification, units and algorithm operations may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the transmit-end device or the receive-end device may be divided into functional modules based on the foregoing method examples. For example, the transmit-end device or the receive-end device may be divided into functional modules corresponding to functions, or two or more functions may be integrated into one processing module. The integrated module may be implemented in a form of hardware, or may be implemented in a form of a software function module. It should be noted that, in this embodiment of this application, division into the modules is an example, and is merely a logical function division. During actual implementation, another division manner may be used. An example in which each functional module is obtained through division based on a corresponding function is used below for description.

Figure 5:
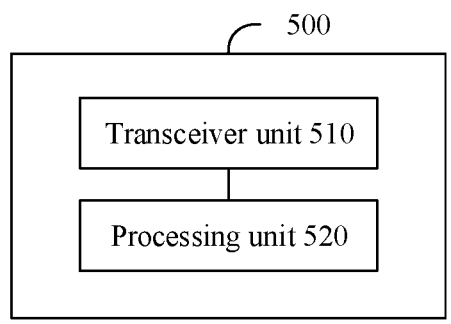
FIG. 5 is a schematic block diagram of a communication apparatus according to an embodiment.

FIG. 5 is a schematic block diagram of a communication apparatus 500 according to an embodiment. The communication apparatus 500 includes a transceiver unit 510 and a processing unit 520. The transceiver unit 510 may communicate with the outside, and the processing unit 510 is configured to process data. The transceiver unit 510 may also be referred to as a communication interface or a communication unit.

The communication apparatus 500 may be configured to perform an action performed by the terminal device in the foregoing method embodiments. In this case, the communication apparatus 500 may be referred to as a terminal device. The transceiver unit 510 is configured to perform operations related to sending and receiving on the terminal device side in the foregoing method embodiments. The processing unit 520 is configured to perform operations related to processing on the terminal device side in the foregoing method embodiments.

Alternatively, the communication apparatus 500 may be configured to perform an action performed by the network device in the foregoing method embodiments. In this case, the communication apparatus 500 may be referred to as a network device. The transceiver unit 510 is configured to perform operations related to sending and receiving on the network device side in the foregoing method embodiments. The processing unit 520 is configured to perform operations related to processing on the network device side in the foregoing method embodiments.

In an embodiment, the transceiver unit 510 is configured to receive pilot measurement configuration information of a plurality of carriers, where the pilot measurement configuration information of the plurality of carriers indicates a pilot association relationship of the plurality of carriers, and the pilot association relationship of the plurality of carriers indicates that pilots of the plurality of carriers correspond to a same spatial domain transmit filter; the processing unit 520 is configured to perform measurement based on the pilot measurement configuration information of the plurality of carriers, to obtain measurement report results of the plurality of carriers; and the transceiver unit 510 is further configured to send the measurement report results of the plurality of carriers.

In another embodiment, the processing unit 520 is configured to generate pilot measurement configuration information of a plurality of carriers, where the pilot measurement configuration information of the plurality of carriers indicates a pilot association relationship of the plurality of carriers, and the pilot association relationship of the plurality of carriers indicates that pilots of the plurality of carriers correspond to a same spatial domain transmit filter; and the transceiver unit 510 is configured to: send the pilot measurement configuration information of the plurality of carriers to a terminal device; and receive, from the terminal device, measurement report results that are of the plurality of carriers and that are obtained based on the pilot measurement configuration information of the plurality of carriers.

In an embodiment, the pilot association relationship of the plurality of carriers may include any one or more of the following: resource identifiers of the pilots that correspond to the same spatial domain transmit filter and that are of the plurality of carriers are the same; resources of the pilots that correspond to the same spatial domain transmit filter and that are of the plurality of carriers have an intersection; reporting resources of the pilots that correspond to the same spatial domain transmit filter and that are of the plurality of carriers are the same; and spatial domain transmit filter identifiers of the pilots that correspond to the same spatial domain transmit filter and that are of the plurality of carriers are the same.

In an embodiment, the measurement report results of the plurality of carriers include measurement results of a plurality of pilots corresponding to the same spatial domain transmit filter, where the plurality of pilots are pilots of the plurality of carriers.

In an embodiment, the measurement report results of the plurality of carriers include measurement results of a plurality of pilots corresponding to the same spatial domain transmit filter, where the plurality of pilots are pilots of the plurality of carriers, and the plurality of pilots include a pilot with an optimal measurement value.

In an embodiment, the measurement report results of the plurality of carriers include measurement results of a plurality of pilots corresponding to the same spatial domain transmit filter, where the plurality of pilots are pilots of the plurality of carriers, and the same spatial domain transmit filter corresponding to the plurality of pilots is a spatial domain transmit filter with an optimal pilot average measurement value.

In an embodiment, the measurement report results of the plurality of carriers may include measurement results of pilots that correspond to one or more same spatial domain transmit filters and that are of the plurality of carriers.

In an embodiment, the measurement report results of the plurality of carriers include at least one of the following: a carrier identifier, a pilot identifier, and a pilot measurement value.

In an embodiment, the plurality of carriers share one radio frequency channel.

In an embodiment, the plurality of carriers are component carriers CCs or bandwidth parts BWPs.

Therefore, in the solution provided in this application, the pilot association relationship of the plurality of carriers is configured for the terminal device, so that the terminal device may report, for the plurality of carriers, the measurement results of the pilots corresponding to the one or more same spatial domain transmit filters. In this way, when the plurality of carriers share one radio frequency channel, the network device can simultaneously use the plurality of carriers to communicate with the terminal device, that is, communication based on carrier aggregation is implemented, and communication efficiency can be improved.

In yet another embodiment, the transceiver unit 510 is configured to receive configuration information of a plurality of carriers, where the configuration information indicates pilots that correspond to a same spatial domain transmit filter and that are of the plurality of carriers; the processing unit 520 is configured to obtain report results of the plurality of carriers based on the configuration information of the plurality of carriers, where the report results of the plurality of carriers indicate the pilots that correspond to the same spatial domain transmit filter and that are of the plurality of carriers; and the transceiver unit 510 is further configured to send the report results of the plurality of carriers to a network device.

In still another embodiment, the processing unit 520 is configured to generate configuration information of a plurality of carriers, where the configuration information indicates pilots that correspond to a same spatial domain transmit filter and that are of the plurality of carriers; and the transceiver unit 510 is configured to: send the configuration information of the plurality of carriers to a terminal device, and receive, from the terminal device, report results that are of the plurality of carriers and that are obtained based on the configuration information of the plurality of carriers, where the report results of the plurality of carriers indicate the pilots that correspond to the same spatial domain transmit filter and that are of the plurality of carriers; and After receiving the report results that are of the plurality of carriers and that are sent by the terminal device, the network device may communicate with the terminal device by using the plurality of carriers simultaneously based on a pilot corresponding to the same spatial domain transmit filter. It may be understood that when a plurality of carriers share one radio frequency channel, the network device can simultaneously use the plurality of carriers to communicate with the terminal device in this embodiment, so that a user capacity can be increased, and communication efficiency can be improved.

It should be understood that the processing unit 520 in the foregoing embodiment may be implemented by a processor or a processor-related circuit, and the transceiver unit 510 may be implemented by a transceiver or a transceiver-related circuit.

Figure 6:
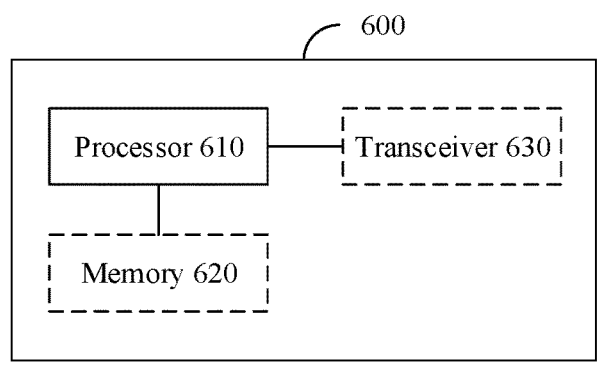
FIG. 6 is a schematic block diagram of another communication apparatus according to an embodiment.

As shown in FIG. 6, an embodiment of this application further provides a communication apparatus 600. The communication apparatus 600 includes a processor 610, the processor 610 is coupled to a memory 620, the memory 620 is configured to store a computer program or instructions, and the processor 610 is configured to execute the computer program or the instructions stored in the memory 620, so that the method in the foregoing method embodiments is performed.

As shown in FIG. 6, the communication apparatus 600 may further include a memory 620.

As shown in FIG. 6, the communication apparatus 600 may further include a transceiver 630. The processor 610 executes the computer program or the instructions stored in the memory 620, so that the processor 610 is configured to perform operations related to processing in the foregoing method embodiments, and the transceiver 630 is configured to perform operations related to sending and receiving in the foregoing method embodiments.

In an embodiment, the communication apparatus 600 may be configured to perform an action of the terminal device side in the foregoing method embodiments.

In another embodiment, the communication apparatus 600 may be configured to perform an action of the network device side in the foregoing method embodiments.

An embodiment of this application further provides a communication apparatus 700. The communication apparatus 700 may be a terminal device or a chip. The communication apparatus 700 may be configured to perform an action performed by the terminal device in the foregoing method embodiments.

Figure 7:
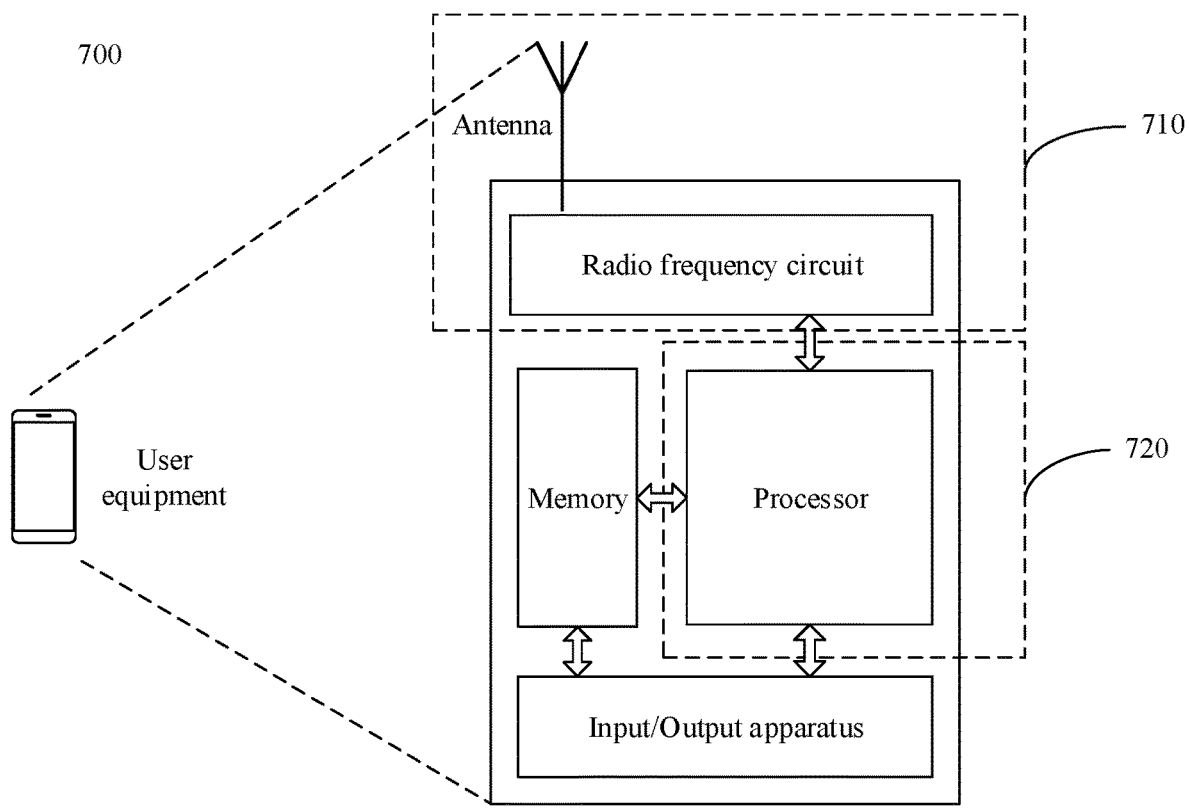
FIG. 7 is a schematic block diagram of a terminal device according to an embodiment.

When the communication apparatus 700 is a terminal device, FIG. 7 is a simplified schematic diagram of a structure of the terminal device. For ease of understanding and convenience of figure illustration, an example in which the terminal device is a mobile phone is used in FIG. 7. As shown in FIG. 7, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The radio frequency circuit may include the radio frequency channel in the foregoing embodiments. The antenna is mainly configured to send and receive the radio frequency signal in a form of an electromagnetic wave. The input/output apparatus, such as a touchscreen, a display, or a keyboard, is mainly configured to: receive data entered by a user and output data to the user. It should be noted that some types of terminal devices may have no input/output apparatus.

When needing to send data, after performing baseband processing on to-be-sent data, the processor outputs a baseband signal to the radio frequency circuit; and the radio frequency circuit performs radio frequency processing on the baseband signal and then sends the radio frequency signal to outside in a form of an electromagnetic wave by using the antenna. When data is sent to the terminal device, the radio frequency circuit receives the radio frequency signal by using the antenna, converts the radio frequency signal into a baseband signal, and outputs the baseband signal to the processor. The processor converts the baseband signal into data, and processes the data. For ease of description, FIG. 7 shows only one memory and one processor. In an actual terminal device product, there may be one or more processors and one or more memories. The memory may also be referred to as a storage medium, a storage device, or the like. The memory may be disposed independent of the processor, or may be integrated into the processor. This is not limited in this embodiment of this application.

In this embodiment, an antenna and a radio frequency circuit that have receiving and sending functions may be considered as a transceiver unit of the terminal device, and a processor that has a processing function may be considered as a processing unit of the terminal device.

As shown in FIG. 7, the terminal device includes a transceiver unit 710 and a processing unit 720. The transceiver unit 710 may also be referred to as a transceiver, a transceiver machine, a transceiver apparatus, or the like. The processing unit 720 may also be referred to as a processor, a processing board, a processing module, a processing apparatus, or the like. In an embodiment, a component that is in the transceiver unit 710 and that is configured to implement a receiving function may be considered as a receiving unit, and a component that is in the transceiver unit 710 and that is configured to implement a sending function may be considered as a sending unit. That is, the transceiver unit 710 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like.

For example, in an embodiment, the transceiver unit 710 is configured to perform a receiving operation on the terminal device side in operation S210 and a sending operation on the terminal device side in operation S230 that are shown in FIG. 2, and/or the transceiver unit 710 is further configured to perform another sending and receiving operation on the terminal device side. The processing unit 720 is configured to perform the operation in operation S220 in FIG. 2, and/or the processing unit 720 is further configured to perform another processing operation of the terminal device side in this embodiment of this application.

For another example, in an embodiment, the transceiver unit 710 is configured to perform a receiving operation on the terminal device side in operation S410 and a sending operation on the terminal device side in operation S420 that are shown in FIG. 4, and/or the transceiver unit 710 is further configured to perform another sending and receiving operation on the terminal device side.

It should be understood that FIG. 7 is merely an example instead of a limitation. The terminal device including the transceiver unit and the processing unit may not depend on the structure shown in FIG. 7.

When the communication apparatus 700 is a chip, the chip includes a transceiver unit and a processing unit. The transceiver unit may be an input/output circuit or a communication interface. The processing unit may be a processor, a microprocessor, or an integrated circuit, integrated on the chip.

An embodiment of this application further provides a communication apparatus 800. The communication apparatus 800 may be a network device or a chip. The communication apparatus 800 may be configured to perform an action performed by the network device in the foregoing method embodiments.

Figure 8:
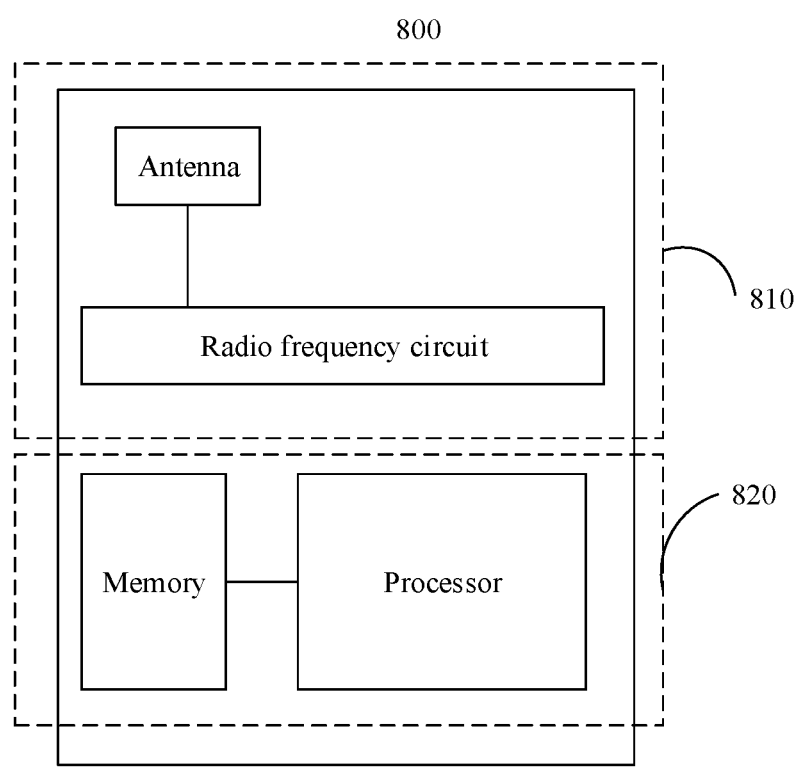
FIG. 8 is a schematic block diagram of a network device according to an embodiment.

When the communication apparatus 800 is a network device, for example, a base station, FIG. 8 is a simplified schematic diagram of a structure of the base station. The base station includes a part 810 and a part 820. The part 810 is mainly configured to: send and receive a radio frequency signal, and perform conversion between the radio frequency signal and a baseband signal. The part 820 is mainly configured to: perform baseband processing, control the base station, and the like. The part 810 may be usually referred to as a transceiver unit, a transceiver machine, a transceiver circuit, a transceiver, or the like. The part 820 is usually a control center of the base station, and may be usually referred to as a processing unit, and is configured to control the base station to perform a processing operation on the network device side in the foregoing method embodiments.

The transceiver unit in the part 810 may also be referred to as a transceiver machine, a transceiver, or the like. The transceiver unit includes an antenna and a radio frequency circuit. The radio frequency circuit is mainly configured to perform radio frequency processing. In an embodiment, a component that is in the part 810 and that is configured to implement a receiving function may be considered as a receiving unit, and a component that is configured to implement a sending function may be considered as a sending unit. That is, the part 810 includes the receiving unit and the sending unit. The receiving unit may also be referred to as a receiver machine, a receiver, a receiver circuit, or the like, and the sending unit may be referred to as a transmitter machine, a transmitter, a transmitter circuit, or the like.

The radio frequency circuit in the part 810 may include the radio frequency channel in the foregoing embodiments.

The part 820 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an embodiment, the plurality of boards may share one or more processors, or the plurality of boards may share one or more memories, or the plurality of boards may simultaneously share one or more processors.

For example, in an embodiment, the part 810 is configured to perform a sending operation on the network device side in operation S210 and a receiving operation on the network device side in operation S230 that are shown in FIG. 2, and/or the part 810 is further configured to perform another sending and receiving operation on the network device side.

For another example, in an embodiment, the part 810 is configured to perform a sending operation on the network device side in operation S410 and a receiving operation on the network device side in operation S420 that are shown in FIG. 4, and/or the part 810 is further configured to perform another sending and receiving operation on the network device side.

It should be understood that FIG. 8 is merely an example instead of a limitation. The network device including the transceiver unit and the processing unit may not depend on the structure shown in FIG. 8.

When the communication apparatus 800 is a chip, the chip includes a transceiver unit and a processing unit. The transceiver unit may be an input/output circuit or a communication interface. The processing unit may be a processor, a microprocessor, or an integrated circuit, integrated on the chip.

An embodiment of this application further provides a computer-readable storage medium. The computer-readable storage medium stores a computer program. When the computer program is executed by a computer, the computer is enabled to implement the method on the terminal device side or the method on the network device side in the foregoing method embodiments.

An embodiment of this application further provides a computer program product including instructions. When the instructions are executed by a computer, the computer is enabled to implement the method on the terminal device side or the method on the network device side in the foregoing method embodiments.

For explanations and beneficial effects of related content in any one of the foregoing provided communication apparatuses, refer to corresponding method embodiments provided above. Details are not described herein again.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by the terminal device or the network device, or a function module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this application may indicate one or more devices and/or other machine-readable media that are configured to store information. The term "machine-readable medium" may include but is not limited to a radio channel and various other media that can store, include, and/or carry instructions and/or data.

It should be understood that, the processor in the embodiments of this application may be a central processing unit (CPU), or may be another general purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor, or the like.

It should be further understood that the memory in the embodiments of this application may be a volatile memory, or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

It should be noted that when the processor is a general-purpose processor, a DSP, an ASIC, an FPGA, or another programmable logic device, a discrete gate or a transistor logic device, or a discrete hardware component, the memory (storage module) is integrated into the processor.

It should be noted that the memory described in this application includes but is not limited to the foregoing memory, and further includes any other suitable type of memory.

A person of ordinary skill in the art may be aware that, in combination with the examples described in the embodiments disclosed in this application, units and algorithm operations may be implemented by electronic hardware or a combination of computer software and electronic hardware. Whether the functions are performed by hardware or software depends on a particular application and a design constraint of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing apparatus and unit, refer to a corresponding process in the foregoing method embodiments, and details are not described herein.

In the several embodiments provided in this application, it should be understood that the provided apparatuses and methods may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit.

When the functions described above are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific embodiments of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of measurement reporting for a communication system, the method comprising:
    receiving, by a terminal device, pilot measurement configuration information of a plurality of carriers from a network device;
    performing, by the terminal device, measurement based on the pilot measurement configuration information, to obtain measurement report results of the plurality of carriers; and
    sending, by the terminal device, the measurement report results of the plurality of carriers to a network device, wherein the pilot measurement configuration information of the plurality of carriers indicates a pilot association relationship of the plurality of carriers, and the pilot association relationship of the plurality of carriers indicates that pilots of the plurality of carriers correspond to a same spatial domain transmit filter,
    wherein resource identifiers of the pilots that correspond to the same spatial domain transmit filter and are of the plurality of carriers are the same resource identifiers.

2. The method according to claim 1, wherein the pilot association relationship comprises one or more of the following:
    resources of the pilots that correspond to the same spatial domain transmit filter and are of the plurality of carriers have an intersection;
    reporting resources of the pilots that correspond to the same spatial domain transmit filter and are of the plurality of carriers are the same reporting resources; and
    spatial domain transmit filter identifiers of the pilots that correspond to the same spatial domain transmit filter and are of the plurality of carriers are the same spatial domain transmit filter identifiers.

3. The method according to claim 1, wherein the measurement report results of the plurality of carriers comprise measurement results of a plurality of pilots corresponding to the same spatial domain transmit filter, and the plurality of pilots are the pilots of the plurality of carriers.

4. The method according to claim 3, wherein
    the plurality of pilots corresponding to the same spatial domain transmit filter comprise a pilot with an optimal measurement value; or
    the same spatial domain transmit filter is a spatial domain transmit filter with an optimal pilot average measurement value.

5. The method according to claim 1, wherein the measurement report results comprise at least one of: a carrier identifier, a pilot identifier, or a pilot measurement value.

6. The method according to claim 1, wherein the plurality of carriers share a radio frequency channel.

7. The method according to claim 1, wherein the plurality of carriers are component carriers (CCs) or bandwidth parts (BWPs).

8. A method of measurement reporting for a communication system, the method comprising:
sending, by a network device, pilot measurement configuration information of a plurality of carriers to a terminal device; and
receiving, by the network device from the terminal device, measurement report results of the plurality of carriers, wherein the measurement report results of the plurality of carriers are obtained based on the pilot measurement configuration information of the plurality of carriers, wherein the pilot measurement configuration information of the plurality of carriers indicates a pilot association relationship of the plurality of carriers, and the pilot association relationship of the plurality of carriers indicates that pilots of the plurality of carriers correspond to a same spatial domain transmit filter,
wherein resource identifiers of the pilots that correspond to the same spatial domain transmit filter and are of the plurality of carriers are the same resource identifiers.

9. The method according to claim 8, wherein the pilot association relationship comprises one or more of the following:
resources of the pilots that correspond to the same spatial domain transmit filter and are of the plurality of carriers have an intersection;
reporting resources of the pilots that correspond to the same spatial domain transmit filter and are of the plurality of carriers are the same reporting resources; and
spatial domain transmit filter identifiers of the pilots that correspond to the same spatial domain transmit filter and are of the plurality of carriers are the same spatial domain transmit filter identifiers.

10. The method according to claim 8, wherein the measurement report results of the plurality of carriers comprise measurement results of a plurality of pilots corresponding to the same spatial domain transmit filter, and the plurality of pilots are the pilots of the plurality of carriers.

11. The method according to claim 10, wherein
the plurality of pilots comprise a pilot with an optimal measurement value; or
the same spatial domain transmit filter corresponding to the plurality of pilots is a spatial domain transmit filter with an optimal pilot average measurement value.

12. The method according to claim 8, wherein the measurement report results comprise at least one of: a carrier identifier, a pilot identifier, or a pilot measurement value.

13. The method according to claim 8, wherein the plurality of carriers share a radio frequency channel.

14. The method according to claim 8, wherein the plurality of carriers are component carriers (CCs) or bandwidth parts (BWPs).

15. A communication apparatus, comprising:
a transceiver, configured to receive pilot measurement configuration information of a plurality of carriers from a network device; and
a processor, configured to perform measurement based on the pilot measurement configuration information of the plurality of carriers, to obtain measurement report results of the plurality of carriers, wherein
the transceiver is further configured to send the measurement report results of the plurality of carriers to a network device, wherein the pilot measurement configuration information of the plurality of carriers indicates a pilot association relationship of the plurality of carriers, and the pilot association relationship of the plurality of carriers indicates that pilots of the plurality of carriers correspond to a same spatial domain transmit filter,
wherein resource identifiers of the pilots that correspond to the same spatial domain transmit filter and are of the plurality of carriers are the same resource identifiers.

16. The communication apparatus according to claim 15, wherein the pilot association relationship comprises one or more of the following:
resources of the pilots that correspond to the same spatial domain transmit filter and are of the plurality of carriers have an intersection;
reporting resources of the pilots that correspond to the same spatial domain transmit filter and are of the plurality of carriers are the same reporting resources; and
spatial domain transmit filter identifiers of the pilots that correspond to the same spatial domain transmit filter and are of the plurality of carriers are the same spatial domain transmit filter identifiers.

17. The communication apparatus according to claim 15, wherein the measurement report results of the plurality of carriers comprise measurement results of a plurality of pilots corresponding to the same spatial domain transmit filter, and the plurality of pilots are the pilots of the plurality of carriers.

18. The communication apparatus according to claim 17, wherein
the plurality of pilots comprise a pilot with an optimal measurement value; or
the same spatial domain transmit filter corresponding to the plurality of pilots is a spatial domain transmit filter with an optimal pilot average measurement value.

19. The communication apparatus according to claim 15, wherein the measurement report results of the plurality of carriers comprise at least one of: a carrier identifier, a pilot identifier, or a pilot measurement value.

20. The communication apparatus according to claim 15, wherein the plurality of carriers share a radio frequency channel.

* * * * *